(12) United States Patent
Wang et al.

(10) Patent No.: US 11,410,062 B2
(45) Date of Patent: Aug. 9, 2022

(54) METHOD AND SYSTEM FOR REDUCING RISK VALUES DISCREPANCIES BETWEEN CATEGORIES

(71) Applicant: Yahoo Holdings, Inc., Sunnyvale, CA (US)

(72) Inventors: Liang Wang, San Jose, CA (US); Angus Xianen Qiu, Sunnyvale, CA (US); Shengjun Pan, San Jose, CA (US)

(73) Assignee: YAHOO AD TECH LLC, Dulles, VA (US)

( * ) Notice: Subject to any disclaimer, the term of this patent is extended or adjusted under 35 U.S.C. 154(b) by 1169 days.

(21) Appl. No.: 15/846,500

(22) Filed: Dec. 19, 2017

(65) Prior Publication Data
US 2019/0188593 A1 Jun. 20, 2019

(51) Int. Cl.
*G06N 3/08* (2006.01)
*G06N 7/00* (2006.01)
*G06Q 30/02* (2012.01)
*G06Q 20/40* (2012.01)

(52) U.S. Cl.
CPC ......... *G06N 7/005* (2013.01); *G06Q 20/4016* (2013.01); *G06Q 30/0248* (2013.01)

(58) Field of Classification Search
CPC . G06N 7/005; G06Q 20/4016; G06Q 30/0248
See application file for complete search history.

(56) References Cited

U.S. PATENT DOCUMENTS

| | | | | |
|---|---|---|---|---|
| 6,658,393 B1 * | 12/2003 | Basch | ................. | G06Q 20/341 705/35 |
| 7,788,195 B1 * | 8/2010 | Subramanian | ......... | G06N 20/00 706/20 |
| 8,805,737 B1 * | 8/2014 | Chen | ..................... | G06Q 40/02 705/38 |

(Continued)

OTHER PUBLICATIONS

J. Goodfellow, et al., "Explaining and harnessing adversarial examples," In Proceedings of the 2015 International Conference on Learning Representations, 2015.

(Continued)

*Primary Examiner* — Michael J Huntley
*Assistant Examiner* — Sung W Lee
(74) *Attorney, Agent, or Firm* — Venable LLP

(57) ABSTRACT

The present teaching generally relates to removing perturbations from predictive scoring. In one embodiment, data representing a plurality of events detected by a content provider may be received, the data indicating a time that a corresponding event occurred and whether the corresponding event was fraudulent. First category data may be generated by grouping each event into one of a number of categories, each category being associated with a range of times. A first measure of risk for each category may be determined, where the first measure of risk indicates a likelihood that a future event occurring at a future time is fraudulent. Second category data may be generated by processing the first category data and a second measure of risk for each category may be determined. Measure data representing the second measure of risk for each category and the range of times associated with that category may be stored.

18 Claims, 18 Drawing Sheets

(56) References Cited

U.S. PATENT DOCUMENTS

| | | | | |
|---|---|---|---|---|
| 9,038,134 | B1* | 5/2015 | Ackerman | H04L 63/08 |
| | | | | 726/2 |
| 10,373,140 | B1* | 8/2019 | Chang | G06Q 20/14 |
| 10,511,585 | B1* | 12/2019 | Amram | G06F 17/16 |
| 2011/0282778 | A1* | 11/2011 | Wright | G06Q 30/0609 |
| | | | | 705/38 |
| 2012/0030080 | A1* | 2/2012 | Slater | G06Q 40/123 |
| | | | | 705/35 |
| 2013/0318613 | A1* | 11/2013 | Archer | G06F 21/577 |
| | | | | 726/25 |
| 2019/0188614 | A1* | 6/2019 | Ferranti | G06Q 10/0635 |

OTHER PUBLICATIONS

S. Gu et al., "Toward deep neural network architectures robust to adversarial examples," In NIPS Workshop on Deep Learning and Representation Learning, 2014.

L. Huang, et al., "Adversarial machine learning," In Proceedings of the 4th ACM workshop on Security and Artificial Intelligence, pp. 43-58, 2011.

R. Kerber, ChiMerge: Discretization of numeric attribute. AAAI-92, Proceedings 9th National Conference on Artificial Intelligence, 1992, pp. 123-128.

Z.C. Lipton, "The mythos of model interpretability," In ICML Workshop on Human Interpretability in Machine Learning, 2016.

P. McDaniel, et al., "Machine Learning in adversarial settings," IEEE Security and Privacy, vol. 14, pp. 68-72, 2016.

N. Papernot, et al., "The limitations of deep learning in adversarial settings," In IEEE European Symposium on Security & Privacy, 2016.

N. Siddiqi, "Credit Risk Scorecards: Developing and Implementing Intelligent Credit Scoring," Hoboken, New Jersey, John Wiley & Sons, 2006. 11, 2012.

* cited by examiner

| Event Identifier | Fraudulent Flag | Timestamp |
|---|---|---|
| 0 | 1 | 01:01 |
| 1 | 0 | 01:07 |
| ... | ... | ... |
| L-1 | 1 | 01:56 |
| L | 1 | 01:59 |

METHOD AND SYSTEM FOR REDUCING RISK VALUES DISCREPANCIES BETWEEN CATEGORIES

BACKGROUND

Technical Field

The present teaching generally relates to reducing risk value discrepancies between categories. More specifically, the present teaching relates to reducing risk value discrepancies between categories for use with a predictive model.

2. Technical Background

A new field in machine learning corresponds to adversarial machine learning. In adversarial machine learning, various machine learning models may be vulnerable to misclassification due to minor offsets to inputs used. For example, an input value A may yield score X for a predictive model, where an input using input value B, which is only slightly different than input value, may yield score Y, which may be vastly different than score X.

In machine learning, and in particular fraud detection and click-through-rate ("CTR") prediction, raw features (e.g., inputs) are modified into a representation capable of being input into one or more predictive models. Fraud detection, as described herein, may correspond to Traffic Protection ("TP"), credit card fraud detection, Internet payment fraud detection, and the like. The modification process is commonly referred to as "feature encoding." However, as mentioned above, a drawback to feature encoding is that, for certain features, small changes to a value of the feature may cause a substantial change to the predictive score. This leaves the predictive model vulnerable to adverse parties who may try to exploit this drawback by modifying feature values to invalidate a, or identify a suspicious, predictive score.

Thus, there is a need for methods and systems that removes the effects of minor changes to feature values causing major changes in predictive scores. The present teaching aims to address these issues.

SUMMARY

The teachings disclosed herein relate to methods, systems, and programming for reducing risk value discrepancies between categories. More particularly, the present teaching relates to methods, systems, and programming related to reducing risk value discrepancies between categories for use with a predictive model.

In one example, a method, implemented on a machine having at least one processor, memory, and communications circuitry capable of connecting to a network for removing perturbations from predictive scoring is described. Data representing a plurality of events detected by a content provider may be received, the data indicating a time that a corresponding event occurred and whether the corresponding event was fraudulent. First category data may be generated by grouping each of the plurality of events into one of a number of categories, each category being associated with a range of times. A first measure of a risk for each category may be determined where the first measure of the risk indicates a likelihood that a future event occurring at a future time is fraudulent. Second category data may be generated by processing the first category data, and a second measure of the risk for each category may be determined. Measure data representing the second measure of risk for each category and the range of times associated with that category may then be stored.

In a different example, a system for removing perturbations from predictive scoring is described. The system may include a user event detection system, a data bin filling system, a measure of risk determination system, and a measure risk database. The user event detection system may be configured to receive data representing a plurality of events detected by a content provider, the data indicating a time that a corresponding event occurred and whether the corresponding event was fraudulent. The data bin filling system may be configured to generate first category data by grouping each of the plurality of events into one of a number of categories, each category being associated with a range of times, and generate second category data by processing the first category data. The measure of risk determination system may be configured to determine a first measure of a risk for each category, where the first measure of the risk indicates a likelihood that a future event occurring at a future time is fraudulent, and determine a second measure of the risk for each category. The measure risk database may be configured to store measure data representing the second measure of risk for each category and the range of times associated with that category.

Other concepts relate to software for implementing the present teaching on removing perturbations from predictive scoring. A software product, in accord with this concept, includes at least one machine-readable non-transitory medium and information and/or instructions stored thereon. The instructions stored on the medium may include executable program code data, parameters in association with the executable program code, and/or information related to a user, a request, content, or information related to removing perturbations from predictive scoring, etc.

In one example, a machine-readable, non-transitory and tangible medium having instructions recorded thereon for removing perturbations from predictive scoring is described. The instructions, when executed by at least one processor of a computing device, may cause the computing device to receive data representing a plurality of events detected by a content provider, the data indicating a time that a corresponding event occurred and whether the corresponding event was fraudulent; generate first category data by grouping each of the plurality of events into one of a number of categories, each category being associated with a range of times; determine a first measure of a risk for each category, wherein the first measure of the risk indicates a likelihood that a future event occurring at a future time is fraudulent; generate second category data by processing the first category data; determine a second measure of the risk for each category; and store measure data representing the second measure of risk for each category and the range of times associated with that category.

Additional novel features will be set forth in part in the description that follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4B is an illustrative diagram of an exemplary data structure for category data, in accordance with various embodiments of the present teaching;

DETAILED DESCRIPTION

Figure 1A:
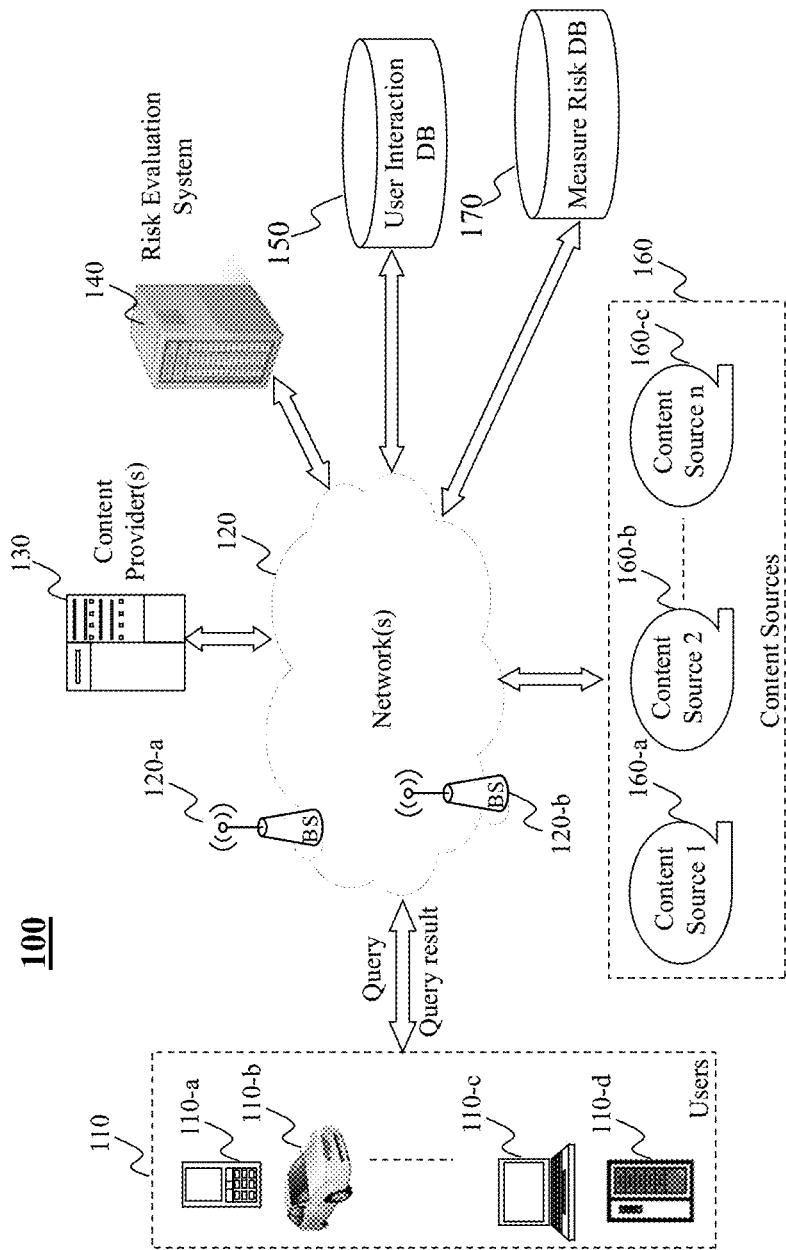
FIGS. 1A and 1B are illustrative diagrams of exemplary network environment for evaluating risk and mitigating effects of feature value manipulation to effect predictive model scores, in accordance with various embodiments of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present disclosure generally relates to systems, methods, medium, and other implementations directed to removes the effects of minor changes to feature values causing major changes in predictive scores. The disclosed teaching on removes the effects of minor changes to feature values causing major changes in predictive scores includes, but is not limited to, receiving data representing events detected by a content provider, generating first category data by grouping each event into a category, determining a first measure of risk for each category, generating second category data by processing the first category data, determining a second measure of risk for each category, and storing measure data representing the second measure of risk.

Predictive scores, as described herein, are values generated by a predictive model, or predictive models. Predictive scores are generated by inputting feature value into a predictive model. Predictive models may be trained using a large number (e.g., hundreds, thousands, etc.) of features, where each feature may reflect a likelihood that of fraudulent activity.

Typically, feature values are processed to generate values that may be input into the predictive model(s). The feature values prior to processing may be referred to as "raw features," or "raw feature values." Prior to being used by the predictive model(s), the raw features may go through a process called "feature encoding," by which the raw features are converted into a format useable by the predictive model(s). One exemplary feature encoding technique is referred to as a "weight of evidence," or WOE. WOE may be employed in a wide number of genres, however in the present discussion, WOE is particularly describing scenarios where fraudulent and non-fraudulent events are references.

In some embodiments, WOE may be described by Equation 1:

$$WOE_i = \log\left(\frac{P_i}{N_i}\right) - \log\left(\frac{P}{N}\right). \qquad \text{Equation 1.}$$

In Equation 1, $P_i$ and $N_i$ correspond to fraudulent events (e.g., positive examples) and non-fraudulent (e.g., negative examples) in the i-th category in a feature, respectively. P and N correspond to fraudulent events (e.g., positive examples) and non-fraudulent (e.g., negative examples) in that occurred in a plurality of events being analyzed. Generally speaking, Equation 1 reflects a portion associated with the odds that a particular category has fraudulent activity, and a second portion indicating the odds of fraudulent activity generally within the plurality of events. For example, if $WOE_i$ is positive, then this may indicate that a fraud probability—a likelihood of fraudulent activity—of a particular category, including a subset of events of the plurality, is greater than the fraud probability of the entire plurality of events. In other words, WOE may measure a relative risk of an event being fraudulent within one category.

Figure 1B:
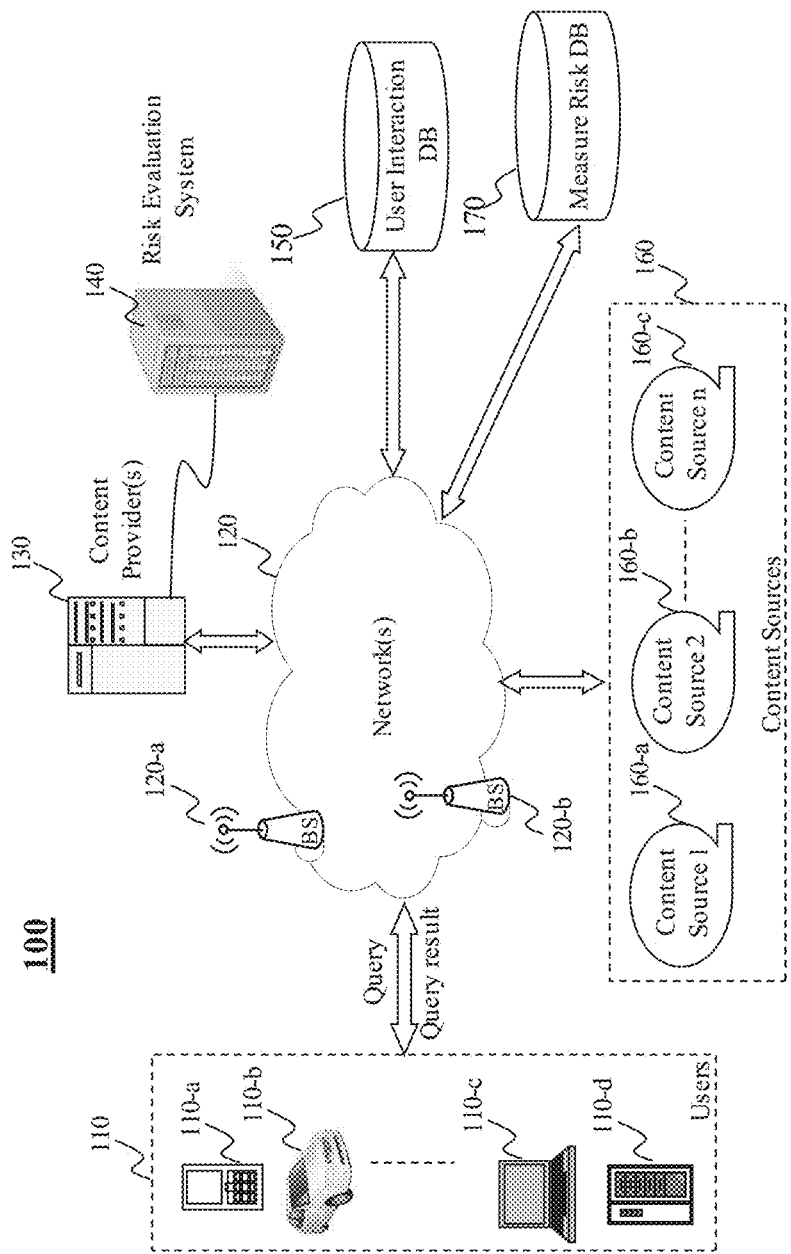

FIGS. 1A and 1B are illustrative diagrams of exemplary network environment for evaluating risk and mitigating effects of feature value manipulation to effect predictive model scores, in accordance with various embodiments of the present teaching. In FIG. 1A, an exemplary networked environment 100 is described. Publishers may earn revenue by providing and displaying advertisements on websites. Generally speaking, the greater the number of visitors (e.g., traffic) at that website where the advertisement is displayed, the greater the revenue for the publisher. However, dishonest and fraudulent individuals, companies, etc., may use these same principles to collect money under false pretenses. For example, a fraudulent user, which as described herein may correspond to any individual, group of individuals, business, and/or entity, that is attempting to obtain revenue under false pretenses, may create websites and/or take over an existing website, simulate traffic, and earn revenue via that traffic. Fraudulent users who create multiple sites, each of which only collects a smaller amount of money, may further compound this problem. This may allow the fraudulent users to go unnoticed, as no one website generates enough money to raise suspicion, however collectively the sites may bring in a larger amount of revenue for the fraudster.

In order to for fraudulent users to simulate traffic for each website created, the fraudulent users may need certain data. For example, and without limitation, user devices, browser cookies, internet protocol ("IP") addresses, user agent strings, and the like, may be needed in order to simulate believable traffic. As an illustrative example, multiple browser cookies may be generated by repeatedly extracting a browser cookie from a web browser's cache file, clearing that browser's browsing history, and browsing again thereby generating a new browser cookie. In certain scenarios, fraudulent users may take those extracted browser cookies and place them on additional user devices so that different devices share one or more same browser cookies. User agent strings may also be fraudulently created using web automation tools to alter the user agent string. This, for example, may allow a user agent string that is initially declared as being for one type of operating system to be modified such that it declares itself as being for a different type of operating system. While changing/modifying IP addresses is slightly more difficult, fraudulent users may employ IP botnets or cloud servers to acquire IP addresses, which may even be shared amongst fraudulent users across multiple websites.

FIG. 1A is an illustrative diagram of an exemplary networked environment for detecting one or more fraudulent events, in accordance with various embodiments of the present teaching. In FIG. 1A, an exemplary networked environment 100 includes may include one or more user devices 110, a content provider 130, one or more content sources 160, and a risk evaluation system 140, each of which may be capable of communicating with one another via one or more networks 120. Network(s) 120, in some embodiments, may be a single network or a combination of different networks. For example, network(s) 120 may be a local area network ("LAN"), a wide area network ("WAN"), a public network, a private network, a proprietary network, a Public Telephone Switched Network ("PSTN"), the Internet, an intranet, a wireless network, a virtual network, and/or any combination thereof. In one embodiment, network(s) 120 may also include various network access points. For example, networked environment 100 may include wired or wireless access points such as, and without limitation, base stations or Internet exchange points 120-a . . . 120-b. Base stations 120-a, 120-b may facilitate, for example, communications to/from user devices 110 with one or more other components of networked environment 100 across network(s) 120.

User devices 110 may be of different types to facilitate one or more users operating user devices 110 to connect to network(s) 120. User devices 110 may correspond to any suitable type of electronic device including, but not limited to, desktop computers 110-d, mobile devices 110-c (e.g., mobile phones, smart phones, personal display devices, personal digital assistants ("PDAs"), gaming consoles/devices, wearable devices (e.g., watches, pins/broaches, headphones, etc.), transportation devices 110-b (e.g., cars, trucks, motorcycles, boats, ships, trains, airplanes), mobile computers 110-a (e.g., laptops, ultrabooks), smart devices (e.g., televisions, set top boxes, smart televisions), smart household devices (e.g., refrigerators, microwaves, etc.), and/or smart accessories (e.g., light bulbs, light switches, electrical switches, etc.). A user (e.g., an individual or individuals), in one embodiment, may send data (e.g., a request) and/or receive data (e.g., content) via user devices 110.

Content sources 160 may include one or more content providers 160-a, 160-b, and 160-c, in some embodiments. Although three content sources are shown within environment 100, any number of content providers may be included. Content sources 160 may correspond to any suitable content source, such as, and without limitation, an individual, a business, an organization, and the like, which may be referred to herein collectively as an "entity" or "entities." For example, content sources 160 may correspond to a government website, a news site, a social media website, and/or a content feed source (e.g., a blog). In some embodiments, content sources 160 may be vertical content sources. Each content source 160 is configured to generate and send content to one or more of user devices 110 via network(s) 120. The content (e.g., a webpage) may include information consumable by a user via their user device 120, for instance, as well as one or more advertisements or other information.

Content provider(s) 130 may correspond to one or more content providers such as, and without limitation, a publisher or publishers that publish content and/or advertisements. For example, content provider(s) 130 may be configured to present content obtained from one or more of content sources 160. In some embodiments, content providers 130 may present one or more advertisements thereon, which may be selected from an advertisement database, an advertisement source, and/or any other suitable entity (e.g., content source 160). In some embodiments, content provider(s) 130 is/are configured to provide product(s) and/or service(s), and may be configured to handle the advertising process for its own product(s) and/or a service (e.g., websites, mobile applications, etc.) related to advertising, or a combination thereof. For example, content providers 130 may include such systems as an advertising agency or a dealer of advertisement that operates a platform that connects an advertiser or advertising agency one or more additional entities.

Risk evaluation system 140, as described in greater detail below, may be configured to measure an amount of risk associated with one or more user activities, and may further modify feature values to mitigate the effects associated with slight perturbations in feature values, and the effect that those perturbation values may incur in outputs from a predictive model. In some embodiments, risk evaluation system 140 may obtain user interaction/user activity data from a user interaction database 150. The user interaction data may represent a plurality of user events that have occurred on/detected by content provider 130. For example, user activity data associated with a webpage hosted by a content provider 130 may be stored by user interaction database 150. The interaction data may be associated with a certain temporal duration. For example, user activity associated with a day's worth of traffic at a webpage may be stored by user interaction database 150. In some embodiments, the data may indicate a time that a corresponding event of the plurality of events occurred, as well as an indication as to whether that event was classified as being fraudulent.

Risk evaluation system 140 may further be configured, in some embodiments, to generate category data by grouping, also referred to herein as binning or segmenting, each of the plurality of events into one or more categories or bins. Each category may be associated with a distinct range of times. For example, category data may be generated including twenty-four categories or bins, each associated with a one-hour time interval across a day. Events that occurred during a particular time interval may be grouped into a corresponding category. As described herein, a bin or category may be used interchangeably.

A measure of risk may then be determined for each category. The measure of risk may indicate a likelihood that a future event that occurs during a same time interval is fraudulent. For example, if events occurring during the times 12:00-1:00 AM have a measure of risk of 0.79, then this may indicate that a future event that occurs between the hours of 12:00 AM and 1:00 AM, based on substantially the same input conditions, has a 79% chance of being a fraudulent act.

In some embodiments, based on the measure of risks for each category, the category data may be processed to generate new/modified category data. The processing, in one embodiment, may correspond to applying a smoothing function to the category data to reduce any sharp transitions between measure of risk values between adjacent categories. After the processing (e.g., applying the smoothing function), measures of risk may be determined again for each category, and these values may be stored within measure risk database 170 for future use by one or more predictive models. In this way, when a future event occurs, the stored measure of risk values may be employed to determine a likelihood that the future event is fraudulent.

Networked environment 100 of FIG. 1B, in one illustrative embodiment, may be substantially similar to networked environment 100 of FIG. 1A, with the exception that risk evaluation system 140 may serve as a backend for content provider(s) 130. Alternatively, content provider(s) 130 may serve as a backend for risk evaluation system 140.

Figure 2A:
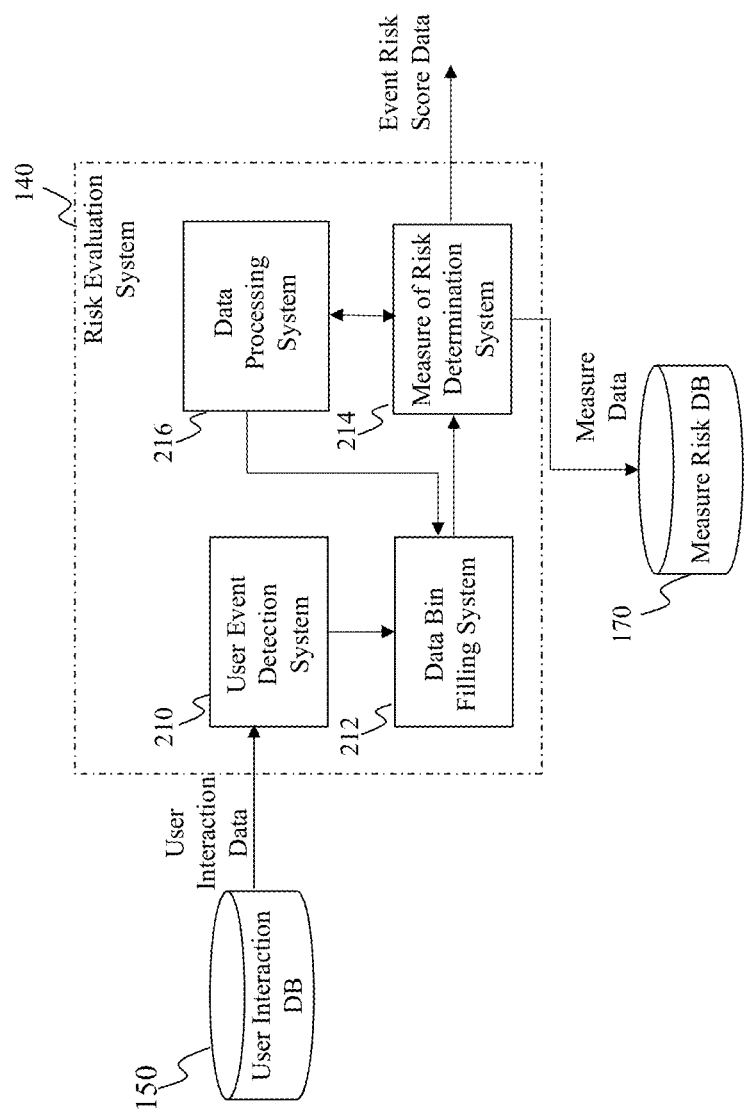
FIG. 2A is an illustrative diagram of an exemplary risk evaluation system, in accordance with various embodiments of the present teaching.

FIG. 2A is an illustrative diagram of an exemplary risk evaluation system, in accordance with various embodiments of the present teaching. In the non-limiting embodiment, risk evaluation system 140 may include a user event detection system 210, a data bin filling system 212, a measure of risk determination system 214, and a data processing system 216.

In some embodiments, risk evaluation system 140 may include one or more processors, memory, and communications circuitry. The one or more processors of risk evaluation system 140 may include any suitable processing circuitry capable of controlling operations and functionality of one or more components/modules of risk evaluation system 140, as well as facilitating communications between various components within risk evaluation system 140 and/or with one or more other systems/components of network environments 100, 150. In some embodiments, the processor(s) may include a central processing unit ("CPU"), a graphic processing unit ("GPU"), one or more microprocessors, a digital signal processor, or any other type of processor, or any combination thereof. In some embodiments, the functionality of the processor(s) may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 402 may include its own local memory, which may store program systems, program data, and/or one or more operating systems. However, the processor(s) may run an operating system ("OS") for one or more components of risk evaluation system 140 and/or one or more firmware applications, media applications, and/or applications resident thereon. In some embodiments, the processor(s) may run a local client script for reading and rendering content received from one or more websites. For example, the processor(s) may run a local JavaScript client for rendering HTML or XHTML content received from a particular URL accessed by user device(s) 110.

The memory may include one or more types of storage mediums such as any volatile or non-volatile memory, or any removable or non-removable memory implemented in any suitable manner to store data for risk evaluation system 140. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, the memory may be implemented as computer-readable storage media ("CRSM"), which may be any available physical media accessible by the processor(s) to execute one or more instructions stored within the memory.

The communications circuitry may include any circuitry allowing or enabling one or more components of risk evaluation system 140 to communicate with one another, and/or with one or more additional devices, servers, and/or systems. In some embodiments, communications between one or more components of risk evaluation system 140 may be communicated with user devices 110, content sources 160, content provider(s) 130, etc., via the communications circuitry. For example, network(s) 120 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and/or wireless application protocol ("WAP"). Various additional communication protocols may be used to facilitate communications between various components of risk evaluation system 140, including, but not limited to, Wi-Fi (e.g., 802.11 protocol), Bluetooth, radio frequency systems (e.g., 800 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP.

The communications circuitry may use any communications protocol, such as any of the previously mentioned exemplary communications protocols. In some embodiments, one or more components of risk evaluation system 140 may include one or more antennas to facilitate wireless communications with a network using various wireless technologies (e.g., Wi-Fi, Bluetooth, radiofrequency, etc.).

In yet another embodiment, one or more components of user activity detection system may include one or more universal serial bus ("USB") ports, one or more Ethernet or broadband ports, and/or any other type of hardwire access port so that the communications circuitry facilitates communications with one or more communications networks.

User event detection system 210, in the illustrative embodiment, may be configured to receive user interaction data from user interaction database 150. The interaction data may be retrieved periodically (e.g., hourly, daily, weekly, etc.), as well as, or alternatively, in response to a request received by risk evaluation system 140. The interaction data may represent event data corresponding to a plurality of events that occurred at, or detected by, a content provider 130 during a certain temporal duration. For example, the interaction data may indicating the various user interactions detected by a webpage for a certain time period. Each event included within the interaction data may include, amongst other aspects, temporal metadata and fraudulent metadata. The temporal metadata, for instance, may indicate a time that a corresponding event occurred. The fraudulent metadata, for instance, may indicate whether that particular event is fraudulent or non-fraudulent. In some embodiments, the fraudulent metadata may be determined beforehand, for instance, by a fraudulent user activity detection system.

Data bin filling system 212, which may also be referred to as data category filling system 212, may be configured, in one embodiment, to group events from the interaction data into a corresponding category/bin. For example, data bin filling system 212 may define, determine, or obtain, a number of categories with which the interaction data is to be binned into, and may generate the number of categories. Data bin filling system 212 may further be configured to analyze each event, and may determine, based at least in part on the temporal metadata, a category with which each event is to be grouped into. For example, events occurring during the times 1:01 PM and 2:00 PM may be placed in a first category, events occurring during the times 2:01 PM and 3:00 PM may be placed in a second category, and so on.

Measure of risk determination system 214, in some embodiments, may be configured to determine a measure of risk associated with the events included within each category. The measure of risk, as described herein, may correspond to a likelihood that a future event associated with a particular category will be fraudulent. For example, if the measure of risk for a first category is 0.79, and the first category is associated with events occurring within the time interval 1:01 PM and 2:00 PM, then a future event, occurring at time 1:30 PM, may have a 79% chance of being fraudulent. In some embodiments, measure of risk determination system 214 may be configured to determine whether a difference between a measure of risk between two adjacent categories is greater than a threshold, and if so, may process the category data to generate new category data that smooths the transitions between the categories. For example, if the measure of risk for a first category, associated with the times 1:01 PM to 2:00 PM, is 0.79, while the measure of risk for a second category, associated with the times 2:01 PM to 3:00 PM, is 0.35, then it may be easy for a fraudulent user to circumvent the system by performing actions during the second category's times as oppose to the first category's times to reduce the likelihood of the fraudulent activity being detected. Accordingly, as described in greater detail below, a smoothing function may be applied to the first category data to reduce the difference between the measure of risk of adjacent categories. In some embodiments, measure data representing the measure of risk for each category may be stored within measure risk database 170.

Data processing system 216 may be configured to determine whether a smoothing function is needed to be applied to the category data, and may apply the appropriate smoothing function. Continuing the previous example, the difference between the measures of risk for times 1:01-2:00 PM and 2:01-3:00 PM may be 0.39. If the threshold transition value is set at 0.1, then data processing system 216 may determine that a smoothing function may be needed to be applied to the category data to reduce the discrepancy between the two categories' measure of risks. As an illustrative example, application of the smoothing function may cause the measures of risk for the two time intervals to change from 0.79 and 0.39, to 0.65 and 0.56.

Figure 2B:
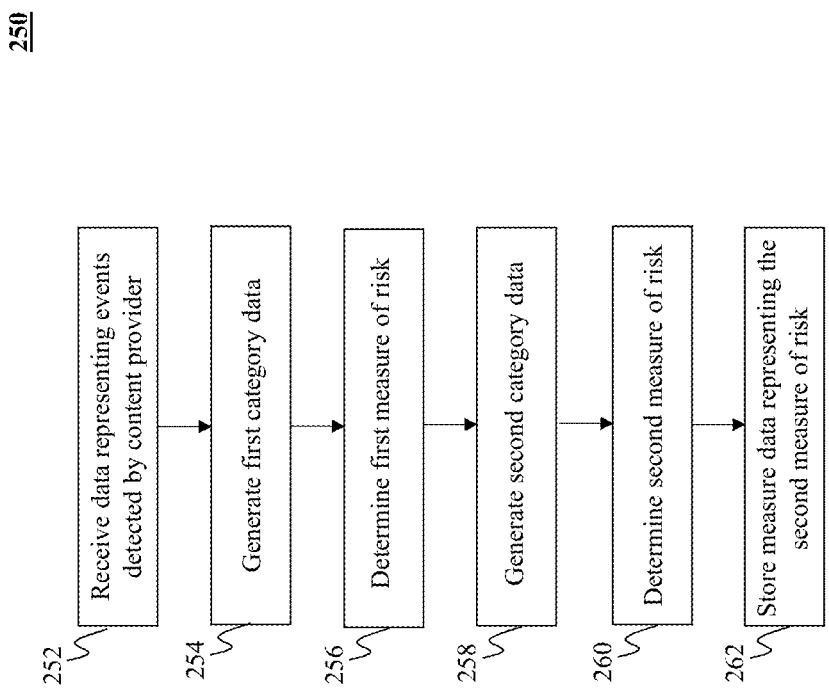
FIG. 2B is an illustrative flowchart of an exemplary process for mitigating the effects of feature value manipulation, in accordance with various embodiments of the present teaching.

FIG. 2B is an illustrative flowchart of an exemplary process for mitigating the effects of feature value manipulation, in accordance with various embodiments of the present teaching. In the illustrative, non-limiting, embodiment, a process 250 may begin at step 252. At step 252, data representing events detected by a content provider may be received. For example, content provider 130 (e.g., a webpage) may detect user activities/user interactions therewith. These interactions may be logged and stored by user interaction database 150. The user interactions may, in one embodiment, correspond to events that occurred during a particular temporal duration (e.g., over the course of one day, or 24-hours). In some embodiments, user event detection system 210 may be configured to receive data representing these events, where the data indicates a time that the event occurred (e.g., via temporal metadata) as well as whether that event corresponds to a fraudulent action (e.g., fraudulent metadata).

At step 254, first category data may be generated. For instance, data bin filling system 212 may be configured to receive the data representing the events from user event detection system 210, and may group the events into a category. In some embodiments, the grouping of events into one of a number of categories may be based on the temporal metadata. For example, data bin filling system 212 may initialize twenty-four (24) data bins, each corresponding to a category (e.g., a one-hour temporal interval), and may group the events into one of the categories. In some embodiments, the categories may be non-overlapping.

At step 256, a first measure of risk may be determined. In some embodiments, the first measure of risk may be determined for each category. For example, a measure of risk for each one-hour time interval may be determined. In one embodiment, the first measure of risk may be determined using WOE, as described above with relation to Equation 1. Measure of risk determination system 214, in the illustrative embodiment, may be configured to determine the measure of risk for each category.

At step 258, second category data may be generated. In some embodiments, data processing system 216 may determine that a smoothing function is needed to be applied to the category data to reduce transitions between measure of risk values for adjacent categories. In this particular scenario, data processing system 216 may process the category data by applying the smoothing function. In response, the smoothed data may be provided back to data bin filling system 212, which in turn may generate second category data including the events distributed into the appropriate categories.

At step 260, a second measure of risk may be determined. The second measure of risk may be determined, in some embodiments, in a substantially similar manner as the first measure of risk, however in this particular instance, the second category data may be employed (e.g., post-processing). In one embodiment, measure of risk determination system 214 may determine the second measure of risk using the second category data.

At step 262, measure data representing the second measure of risk may be stored. For example, the measure data may be stored in measure risk database 170. In some embodiments, the measure risk data may include the measure of risk score for each category, and temporal information indicating an associated temporal interval of the corresponding category.

Figure 3A:
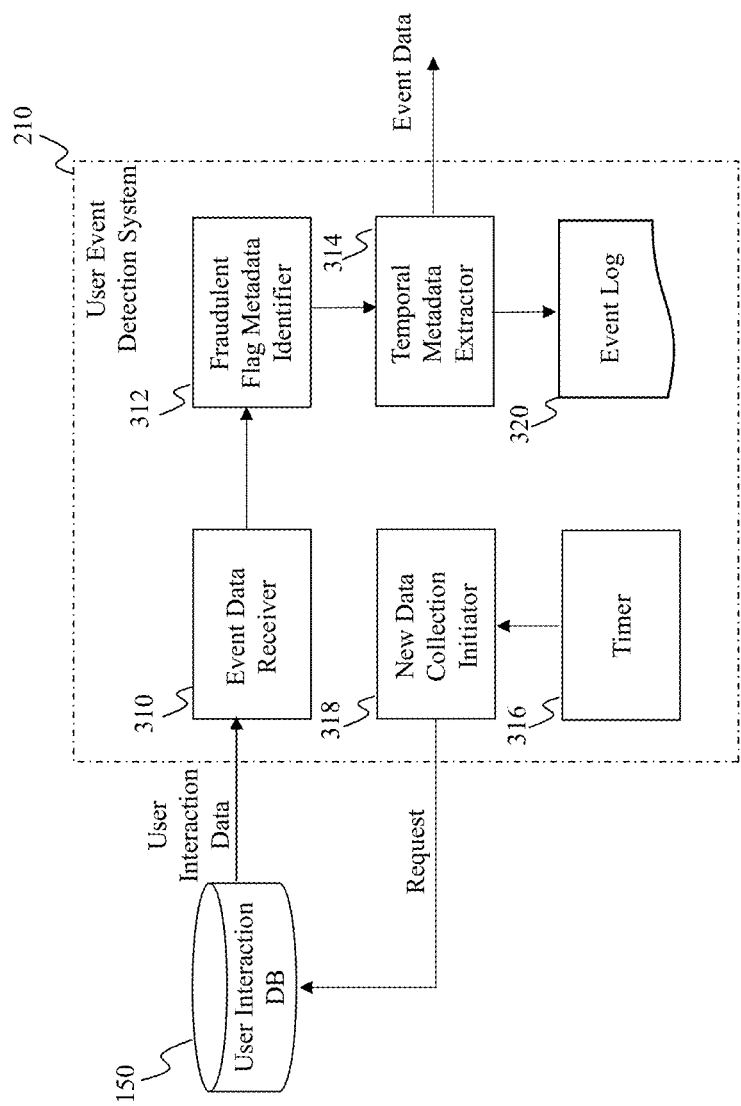
FIG. 3A is an illustrative diagram of an exemplary user event detection system, in accordance with various embodiments of the present teaching.

FIG. 3A is an illustrative diagram of an exemplary user event detection system, in accordance with various embodiments of the present teaching. User event detection system 210, in a non-limiting embodiment, may include an event data receiver 310, a fraudulent flag metadata identifier 312, and a temporal metadata extractor 314. In some embodiments, user event detection system 210 may include a timer 316 and a new data collection initiation 318.

Event data receiver 310, in one embodiment, may be configured to receive user interaction data from user interaction database 150. Event data receiver 310 may receive a user interaction data periodically and/or continually. In the latter scenario (e.g., continually), event data receiver 310 may be configured to collect interaction data associated with certain temporal durations prior to being sent to fraudulent flag metadata identifier 312.

Fraudulent flag metadata identifier 312 may be configured to analyze the user interaction data received from event data receiver 310 and determine which events are fraudulent, and which events are not fraudulent. In some embodiments, the user interaction data associated with each event may include fraudulent metadata that indicates whether that particular event represents a fraudulent event. In one embodiment, the fraudulent metadata may be a binary indicator. For instance, data associated with a particular event may include a data flag set to 1 (e.g., a logical 1, TRUE) that indicates that the associated event is a fraudulent event, or that the event may include a data flag sent to 0, (e.g., a logical 0, FALSE) that indicates that the associated event is a non-fraudulent event. In some embodiments, fraudulent flag metadata identifier 312 may be further configured to parse the user interaction data such that only data associated with events where the fraudulent metadata indicates a fraudulent event. In yet further embodiments, fraudulent flag metadata identifier 312 may parse the interaction data into two groups, data associated with fraudulent events (e.g., flag set to 1) and data associated with non-fraudulent events (e.g., flag set to 0).

Temporal metadata extractor 314, in one embodiment, may be configured to extract the temporal metadata from the user interaction data. Data associated with each event may include temporal metadata indicating a time that an associated event occurred. Temporal metadata extractor 314 may, therefore, reveal a time that the corresponding event occurred, which may then be used to generate event data employed by data bin filling system 212 to group events into categories. In some embodiments, temporal metadata extractor 314 may log each event that will be output with the event data into an event log 320. Event log 320, for example, may track and store each event, fraudulent as well as, in some instance, non-fraudulent, and a corresponding time that the particular event occurred.

User event detection system 210 may include timer 316, which may be configured to track an amount of time between when user interaction data is sent to event data receiver 310. In some embodiments, timer 316 may begin to its timer in response to a new data collection initiation signal being sent from new data collection initiator 318 to user interaction database 150. Timer 316 may continue to monitor an amount of time that elapses since the initiation signal was sent until the amount of time reaches and/or exceeds a temporal threshold. For example, the temporal threshold may be a few seconds, minutes, one or more hours, one or more days, and the like. After timer 316 determines that the amount of time has reached and/or exceeded the temporal threshold, timer 318 may notify new data collection initiator 318, which in turn may generate and send an instruction to user interaction database 150 to send user interaction data associated with a particular content provider 130 to event data receiver 310. The instruction may further indicate a temporal duration with which the user interaction data should encompass. For example, the instruction may indicate that user interaction database 150 is to send user interaction data for all user events that occurred since a last instance of the instruction was sent from new data collection initiator 318 to user interaction database 150.

Figure 3B:
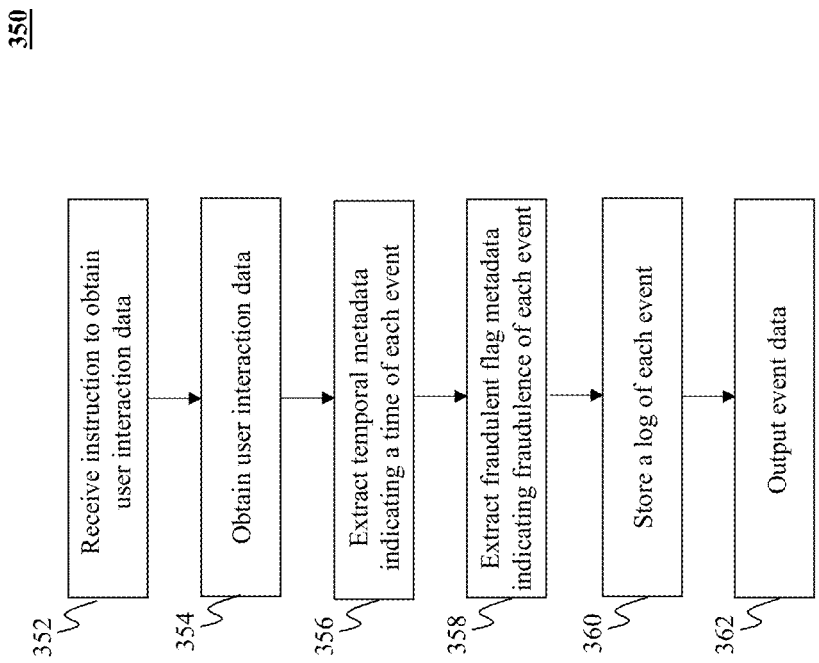
FIG. 3B is an illustrative flowchart of an exemplary process for generating event data, in accordance with various embodiments of the present teaching.

FIG. 3B is an illustrative flowchart of an exemplary process for generating event data, in accordance with various embodiments of the present teaching. Process 350, in a non-limiting embodiment, may begin at step 352. At step 352, an instruction may be received to obtain user interaction data. For instance, in response to timer 316 determining that a temporal threshold has been met, new data collection initiator 318 may generate an instruction, and may send that instruction to user interaction database 150.

At step 354, user interaction data may be obtained. For instance, event data receiver 310 may receive user interaction data from user interaction database 150. In some embodiments, the user interaction data may be associated with an amount of time that has elapsed since a last instruction to obtain user interaction data was received by user interaction database 150.

At step 356, temporal metadata may be extracted from the user interaction data. The temporal metadata may indicate a time that each event included within the user interaction data occurred. In some embodiments, temporal metadata extractor 314 may extract the temporal metadata associated with each event represented by the user interaction data. At step 358, fraudulent flag metadata may be extracted. Fraudulent flag metadata may indicate whether a corresponding event is classified as being fraudulent. In some embodiments, fraudulent flag metadata identifier 312 may identify whether a particular event is fraudulent based on the fraudulent metadata associated with each event.

At step 360, a log of each event may be stored. For example, each event, as well as whether that event was fraudulent or non-fraudulent, and a time that the particular event occurred, may be logged by event log 320. At step 362, event data may be output. The event data may represent a plurality of events that were detected by a content provider, and may include the temporal metadata (e.g., a time that each of the events occurred) and fraudulent metadata (e.g., whether each event is fraudulent or non-fraudulent). The event data, for example, may be provided to data bin filling system 212 from user event detection system 210.

Persons of ordinary skill in the art will recognize that, in some embodiments, user event detection system 210 may analyze the user interaction data beforehand. For instance, the user interaction data may be processed to determine event data representing a plurality of events that were detected by a content provider 130 during a particular temporal duration offline. In this particular scenario, the event data may further be generated to include the temporal metadata and the fraudulent metadata, such that the extraction of the temporal metadata and the fraudulent metadata for each event may further occur offline. In still yet another embodiment, user event detection system 210, or an instance of user event detection system 210, may be in communication with risk evaluation system 140, as opposed to being a sub-system of risk evaluation system 140.

Figure 4A:
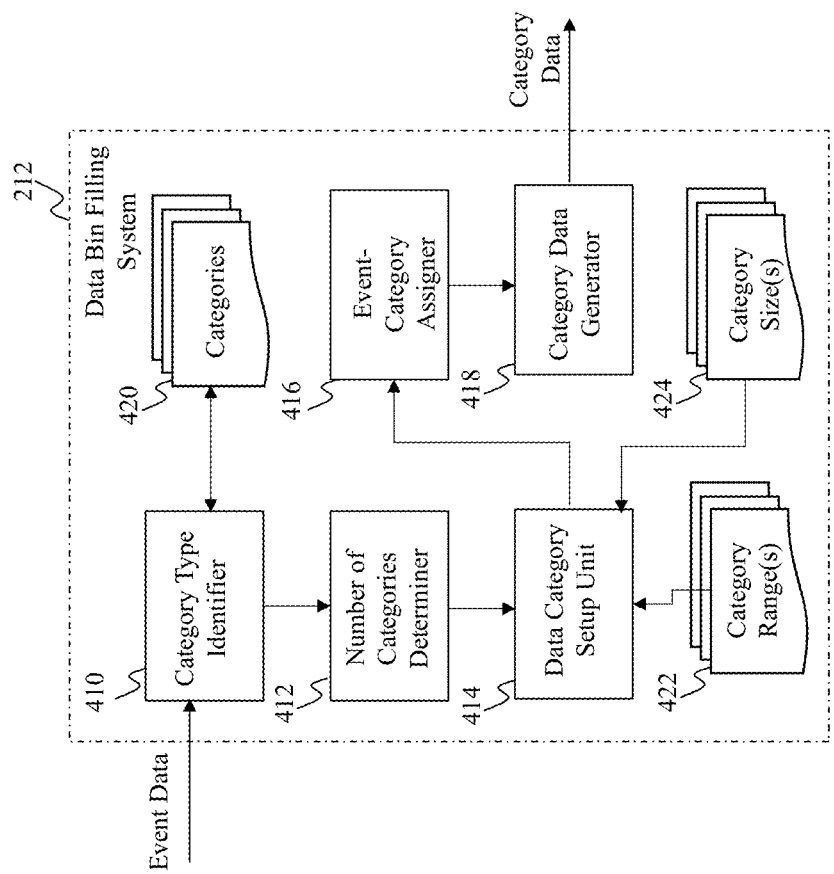
FIG. 4A is an illustrative diagram of an exemplary data bin filling system, in accordance with various embodiments of the present teaching.

FIG. 4A is an illustrative diagram of an exemplary data bin filling system, in accordance with various embodiments of the present teaching. Data bin filling system 212, in the illustrative embodiment, includes a category type identifier 410, a number of categories determiner 412, a data category setup unit 414, an event-category assigner 416, and a category data generator 418.

Category type identifier 410 may be configured to determine a type of category that is to be analyzed. The type of category, for instance, may be associated with the predictive model or models being employed, as well as the particular feature of features being input to the predictive model. In some embodiments, category type identifier 410 may identify the type of category based on the event data received. For example, if the event data represents a plurality of events, each associated with temporal metadata and fraudulent data, then category type identifier 410 may determine that the type of category that the data is associated with a feature "hour of the day," corresponding to the category "hours." The feature "hour of the day," in one embodiment, may correspond to categories that are associated with each hour interval during the course of a day. In some embodiments, category type identifier 410 may access categories 420.

Categories 420 may correspond to various types of categories associated with various features that may be input to the predictive model(s). For instance, various other features may also be employed including, but not limited to, browser cookie ("bcookie") age, distance from home, visits in a past X days—where X=1/24, 1/2, 1, 7, etc., number of clicks for an entity in a past X days, average click-through-rate ("CTR") for an entity in a past X days, average fraud in an entity in a past X days, ratio of IP addresses over user agents on a website, and the like. As an illustrative example, the feature "cookie age" may correspond to a different between a current time that an event occurs that stems from a browser cookie (e.g., a click on a content item) and a time when that same browser cookie last logged into the system. For this particular "cookie age" feature, categories may be (0, 1], (1, 3], (3, 7], (7, 15], etc. For instance, for these categories, the values may relate to an amount of time that has elapsed, in days, between a current click event from a browser cookie and the last time that that browser cookie logged into the system (e.g., system 100, 150). As another illustrative example, the feature "distance from home," may correspond to a distance between a current IP address location of a user device associated with a user interaction and a "home" IP address associated with a most frequently used IP address of that user device. In some embodiments, the distance may calculated in terms of "miles," however other units of distance (e.g., feet, meters, kilometers, etc.) may be used. For the "distance from home" feature, categories may correspond to (0, 10], (10, 20], (20, 50], etc.

Number of categories determiner 412 may be configured to determine a number of categories that may be employed based on the category type. For example, if the category corresponds to hour time intervals associated with the feature "hours of the day," then the number of categories may be determined to 24 categories. Each category of the twenty-four categories corresponds to a single one-hour temporal interval during the course of the day. For instances, a first category may correspond to the range of times beginning at a time 0:00 and ending at a time 0:59, a second category may correspond to a range of times beginning at 1:00 and ending at a time 1:59, and so on. Persons of ordinary skill in the art will recognize that different number of categories may also be employed for similar features. For example, if the feature corresponds to minutes of the day, then the category may be minutes, and there may be 1440 categories (e.g., first category from time 00:00:00 to time 00:00:59; a second category may be from time 00:01:00 to time 00:01:59, etc.).

Data category setup unit 414 may be configured to generate the data categories. For example, data category setup unit 414 may allocate portions of memory associated with risk evaluation system 140 for each of the number of categories. The allocated portions may be structured such that data representing each data event is stored within memory and associated with other event having a same parameter. Category range(s) 422 may be employed to determine an appropriate range of units for each category setup by data category setup unit 414. For example, category range(s) 422 may indicate that, for the category "hours," associated with the feature "hours of the day," the category ranges should be associated with 60-minute temporal intervals.

In some embodiments, data category setup unit 414 may employ a Chi-Merge discretization algorithm to determine an optimal range of values for each category. Category size(s) 424 may, in one embodiment, specify a particular amount of memory needed to be allocated for each event and/or restrictions associated with the amount of memory being allocated. For example, X bits may be allocated within the memory, which may have X/N bits available for storing event data falling within a specified range of the category range 420. In the aforementioned example, N corresponds to the number of categories.

In a Chi-Merge discretization technique, each category is continuously merged until a termination condition is met. The Chi-Merge technique may begin by first sorting training examples according to their feature values being discretized. Next, the categories may be constructed using the initial discretization such that each example is assigned to its own category. A Chi-Square test may then be performed for every pair of adjacent categories (e.g., category(i−1) and category (i), category(i) and category(i+1), etc.), with the lowest chi-square value being merged together. The merging may recursively be performed until all pairs of adjacent categories have Chi-Squared values exceeding a threshold value. For example, the threshold may be determined using a P-value test, or may be a constant (e.g., based on number of categories, a minimum number of examples in a category, etc.).

Although Chi-Merge discretization is one example of a technique to "bin" data into different categories, various other types of "binning mechanisms" may also be employed. For instance, an "equal-width binning" technique and an "equal-population binning" technique may alternative be employed. For equal-width binning, a range of observed values for a particular feature are grouped together in k categories, each having an equal range. In this particular scenario, the parameter k may be set by an individual using user device 110. As an illustrative example, if a feature has a maximum feature value of $x_{max}$ and a minimum feature value of $x_{min}$, then the range employed for this feature may be $\delta=(x_{max}-x_{min})/k$, and each category may be constructed such that boundaries for that category are defined at $x_{min}+i\delta$, where i=1, 2, . . . , k−1. Equal-population binning techniques may correspond to grouping feature values of a continuous feature into k categories where, given n examples, each category includes n/k (possibly duplicate) adjacent values.

Event-category assigner 416 may be configured, in some embodiments, to assign each event represented by the event data to a particular category. For instance, event data may be segmented into categories based on the temporal metadata associated with that event. For example, data category setup unit 414 initiated each category's data structure, and event-category assigner 416 may assign each event to an appropriate category's data structure. If the categories are temporal categories, for example, each associated with a particular temporal interval (e.g., 24 one-hour time interval categories), and then the events may be placed in one category based on the temporal metadata, which indicates a time that the corresponding event occurred.

Category data generator 418 may, in some embodiments, generate the category data to be output to measure of risk determination system 214. Category data generator 418 may be configured to determine when event-category assigner has completed the assignment of each event included within the event data to a corresponding category data structure. In response, category data generator 418 may finalize the data structures, and may output the category data representing the plurality of data structures including the plurality of events, each having a corresponding event identifier, fraudulent identifier, and timestamp.

FIG. 4B is an illustrative diagram of an exemplary data structure for category data, in accordance with various embodiments of the present teaching. In some embodiments, the allocated memory may be configured in a data structure 440 (or structures) such that an entry in data structure 440 is associated with each event. Data category setup unit 414, for instance, may generate data structures, such as data structures 440, for storing and logging event data and transforming that event data into associated category data, which may then be used for determining a measure of risk associated with each category.

Each entry may include three or more columns, such as event identifier column 442, fraudulent flag column 444, and timestamp column 446. For example, an event may be assigned to a row of the data structure, having an instance identifier associated with that event stored within event identifier column 442 (e.g., the first event having an identifier 0, second event having an identifier 1, . . . L-th event having an identifier L, etc.). The event may have a fraudulent metadata indicator stored within fraudulent flag column 444, indicating whether the corresponding event of that row (e.g., an entry) is fraudulent or non-fraudulent (e.g., logical 0 for non-fraudulent and logical 1 for fraudulent). The event may further have a timestamp stored within timestamp column 446 indicating a time associated with that row's event, indicating when that event occurred. The format of the timestamp may vary depending on the system, user, etc.

In some embodiments, each category of the number of categories may include a separate data structure 440. For example, for each category associated with a single hour temporal interval over the course of a 24-hour period may include a separate data structure 440 including rows representing events that occurred within that category's corresponding hour temporal interval, and columns 442, 444, and 446, indicating each event's event identifier, fraudulent identifier, and timestamp. The output category data may, in some embodiments, include each data structure 440 associated with each category for a particular feature being analyzed.

Figure 4C:
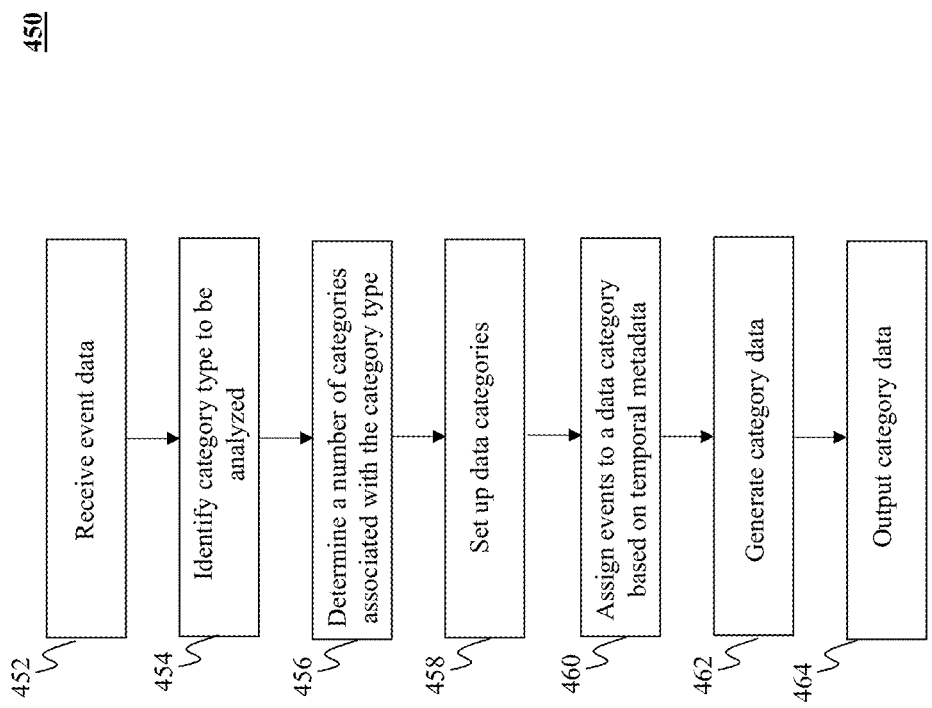
FIG. 4C is an illustrative flowchart of an exemplary process for generating bin data, in accordance with various embodiments of the present teaching.

FIG. 4C is an illustrative flowchart of an exemplary process for generating bin data, in accordance with various embodiments of the present teaching. Process 450, in a non-limiting embodiment, may begin at step 452. At step 452, event data may be received. For instance, category type identifier 410 may receive event data output by user event detection system 210. At step 454, a category type to be analyzed may be identified. In one embodiment, category type identifier 410 may access categories 420 to determine a type of category that the event data is associated with. At step 456, a number of categories associated with the identifier category type may be determined. For instance, number of categories determiner 412 may determine, based on the type of category identifier by category type identifier 410, a number of categories to be employed. For example, for the feature "hours of the day," the category may correspond to "hours," and number of categories determiner 412 may determine that twenty-four categories are to be used.

At step 458, data categories may be set up. For example, as described above, data category setup unit 414 may allocate portions of memory having a particular category size 424 and being associated with a particular category range 422 for data structures to be populated based on the event data. At step 460, events may be assigned to a data category based on temporal metadata included with the event data and associated with each event. For example, event-category assigner 416 may be configured to assign each event to a particular category's data structure based on the category's temporal range and each event's temporal metadata. At step 462, category data may be generated. For instance, category data generator 418 may generate the category data representing the category data structures populated by the event data. At step 464, the category data may be output. For instance, the category data may be output to measure of risk determination system 214.

Figure 5A:
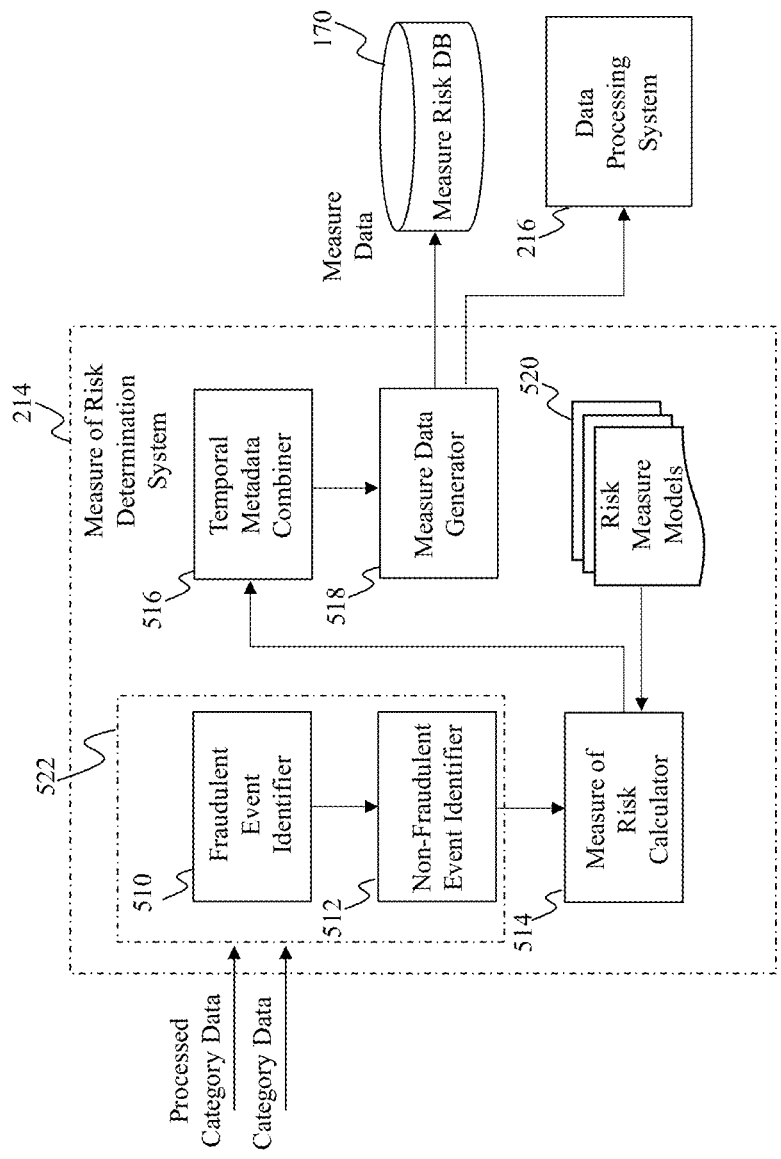
FIG. 5A is an illustrative diagram of an exemplary measure of risk determination system, in accordance with various embodiments of the present teaching.

FIG. 5A is an illustrative diagram of an exemplary measure of risk determination system, in accordance with various embodiments of the present teaching. Measure of risk determination system 214, in the illustrative embodiment, may include a fraudulent event identifier 510, a non-fraudulent event identifier 512, a measure of risk calculator 514, a temporal metadata combiner 516, and a measure data generator 518. In some embodiments, fraudulent event identifier 510 and non-fraudulent event identifier 512 may form an event identifier system 522, which is described in greater detail below.

Event identifier 522 may, in one embodiment, receive the category data output by data bin filling system 212. Upon receipt, event identifier system 522 may provide the category data to fraudulent event identifier 510 and non-fraudulent event identifier 512. In some embodiments, the category data may be provided to fraudulent event identifier 510 and non-fraudulent event identifier 512 in parallel, however persons of ordinary skill in the art will recognize that this is merely exemplary. Fraudulent event identifier 510 may be configured to identify the events included within the category data that include a fraudulent metadata flag indicating that the corresponding event is identified as being fraudulent. Non-fraudulent event identifier 512 may be configured to identify the events included within the category data that include a fraudulent metadata flag indicating that the corresponding event is identified as being non-fraudulent. For example, a row in data structure 440 may have, for fraudulent identifier column 444, a logical 1, indicating that the corresponding event associated with that row has been classified as being fraudulent. As another example, a row in data structure having a logical 0 in fraudulent identifier column 444 may indicate that the corresponding event associated with this row has been classified as being non-fraudulent.

Persons of ordinary skill in the art will recognize that the classification of an event as being fraudulent or non-fraudulent may be done prior to analysis by risk evaluation system 140, in some embodiments. However, in other embodiments, risk evaluation system 140 may perform the analysis of fraudulent/non-fraudulent for each event as well. The basis for analyzing fraudulence for each event may, in some embodiments, be based on a particular entity associated with the event (e.g., a user device 110 that interacted with content provider 130), content provider 130 with which the user interaction data is associated, and the like. For example, the user interaction data may indicate a click-through-rate ("CTR") and/or a time-to-click ("TTC") for a particular event or series of events, and may determine whether the corresponding event(s) is/are fraudulent based on the CTR and/or TTC for that event in relation to one or more threshold CTR and/or TTC values.

Measure of risk calculator 514, in some embodiments, may be configured to determine an amount of risk associated with each category. In some embodiments, measure of risk calculator 514 may employ risk measure models 520 to determine the measure of risk associated with each category. For example, WOE, as described above with relation to Equation 1, may be employed as a risk measure model 520 and used by measure of risk calculator 514 to determine a measure of risk for one or more categories. In one embodiment, measure of risk calculator 514 may generate a measure of risk for each category, and may output the measure of risk associated with each category to temporal metadata combiner 516. In some embodiments, measure of risk calculator 514 may be configured to add an additional column to data structure 440, which may include the measure of risk value generated for a corresponding category represented by that data structure 440. Alternatively or additionally, each data structure 440 may have a metadata addendum attached thereto that includes the calculated measure of risk for that category.

Temporal metadata combiner 516, in one embodiment, may be configured to combine the measure of risk calculated for each category by measure of risk calculator 514 with a corresponding temporal range associated with that category. For example, if a first category is determined to have a measure of risk value of 0.60, and the first category is associated a temporal interval of times t1-t2, then temporal metadata combiner 516 may combine these two pieces of information together.

Measure data generator 518, in one embodiment, may be configured to generate measure data representing the measure of risk for each category and the range of times associated with that category. In some embodiments, measure data generator 518 may be configured to generate a new data structure including the plurality of temporal ranges associated with the number of categories, and the measure of risk values associated with each one of those categories. For example, measure data generator 518 may generate a data structure including rows, where each row represents a corresponding category of the number of categories (hence the number of rows corresponding to the number of categories). Furthermore, the data structure may include two or more columns, where one column may indicate the temporal range associated with that category, and another column may indicate the measure of risk value associated with that category. Measure data generator 518 may therefore be configured to output the measure data to measure risk database 170 for storage. Furthermore, in some embodiments, measure data generator 518 may be configured to output the measure data to data processing system 216.

As described in greater detail below, in some embodiments, measure of risk determination system 214 may be configured to determine a new measure of risk for processed category data in response to data processing system 216 processing the category data and/or one or more conditions being met.

Figure 5B:
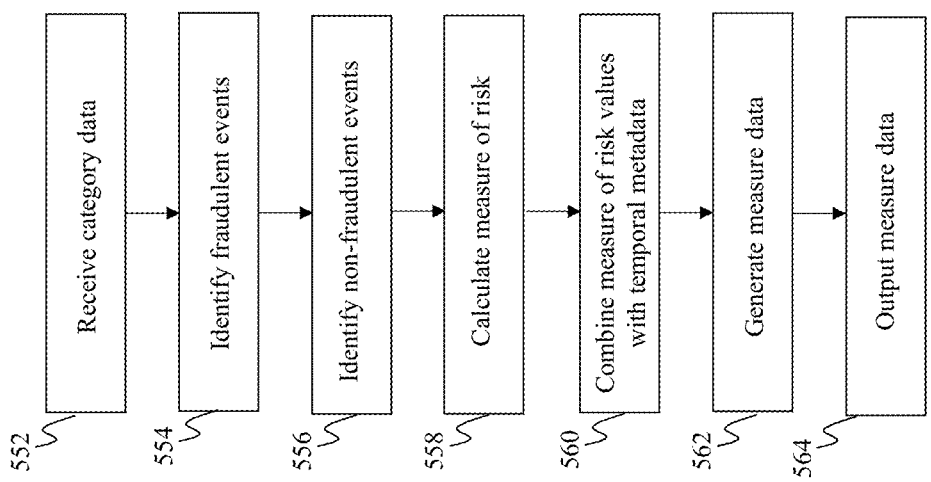
FIG. 5B is an illustrative flowchart of an exemplary process for determining a measure of risk, in accordance with various embodiments of the present teachings.

FIG. 5B is an illustrative flowchart of an exemplary process for determining a measure of risk, in accordance with various embodiments of the present teachings. In a non-limiting embodiment, process 550 may begin at step 552. At step 552, category data may be received. For instance, category data provided by data bin filling system 212 may be received by event identifier system 522. At step 554, fraudulent events may be identified. For example, fraudulent event identifier 510 may identify the fraudulent events included within the category data based on fraudulent identifiers included within fraudulent identifier column 444 of data structure(s) 440. At step 556, non-fraudulent events may be identified. For example, non-fraudulent event identifier 512 may identify the non-fraudulent events included within the category data based on fraudulent identifiers included within fraudulent identifier column 444 of data structure(s) 440.

At step 558, a measure of risk value may be calculated. The measure of risk value may be calculated for each category, in some embodiments. In one embodiment, measure of risk calculator 514 may calculate the measure of risk for each category based, at least in part, on the category data and the analysis of fraudulent events by fraudulent event identifier 510 and non-fraudulent event identifier 512.

At step 560, measure of risk values may be combined with temporal metadata. For instance, temporal metadata combiner 516 may be configured to combine the measure of risk values for each category with the temporal ranges associated with the corresponding category. At step 562, measure data may be generated. For instance, as described above, measure data generator 518 may generate measure data indicating the measure of risk value for each category and the corresponding temporal range. In some embodiments, measure data generator 518 may be configured to generate a new or modified data structure including the measure of risk value for each category associated with the feature being analyzed, as well as the temporal range (e.g., range of times) associated with that category. At step 564, the measure data may be output. In some embodiments, the measure data may be output to measure risk database 170 for storage. Additionally, or alternatively, the measure data may be output to data processing system 216 for further processing.

Figure 6A:
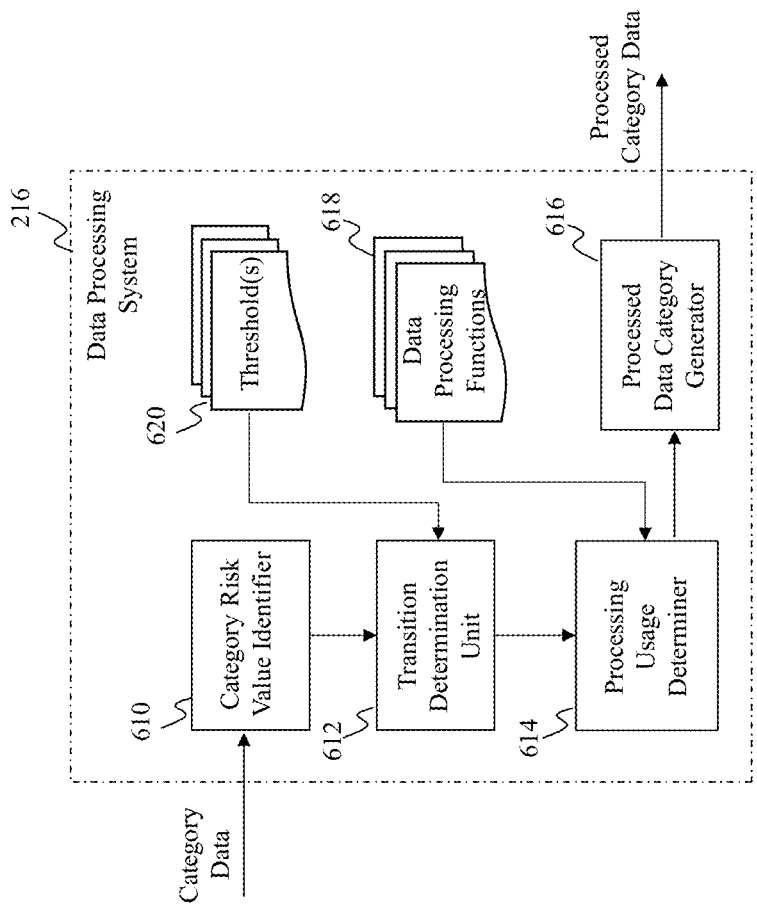
FIG. 6A is an illustrative diagram of an exemplary data processing system, in accordance with various embodiments of the present teaching.

FIG. 6A is an illustrative diagram of an exemplary data processing system, in accordance with various embodiments of the present teaching. Data processing system 216, in the illustrative embodiment, may include a category risk value identifier 610, a transition determination unit 612, a smoothing function usage determiner 614, and a smoothed data category generator 616.

Category risk value identifier 610 may be configured, in some embodiments, to receive category data from measure risk determination system 214. Upon receiving the category data, category risk value identifier 610 may be configured to extract, for each category, a corresponding measure of risk value. For example, for the category "hours" associated with the feature "hours in the day," category risk value identifier 610 may extract 24 measure of risk values, each associated with one of the 24 categories.

Transition determination unit 612 may, in some embodiments, be configured to determine a difference in measure risk values between adjacent categories. For example, category 1 may have a measure of risk value of 0.54, while category 2 may have a measure of risk value of 0.62. In this particular scenario, the transition between category 1 and category 2 may be 0.08 (e.g., |WOE$_1$−WOE$_2$|). Typically, the measure of risk values between adjacent categories, sometimes referred to as data bins, is small (e.g., WOE$_i$~WOE$_{i+1, i-1}$), however this may not always be this case. In some embodiments, while a Chi-Merge discretization algorithm may be employed to determine an optimal range of values for each category, the corresponding transitions between adjacent categories may still be large.

In one embodiment, transition determination unit 612 may access thresholds 620. Transition determination unit 612 may then determine whether the transition between adjacent categories is greater than or equal to the accessed threshold(s) 620. If the transition is greater than or equal to the threshold 620, then transition determination unit 612 may determine that a condition or criteria has been satisfied, and therefore data processing may be needed to reduce the gap between the measure of risk values for adjacent categories. In this particular scenario, transition determination unit 612 may notify processing function usage determiner 614 that a data processing function 618 may be needed for processing the data. For example, an illustrative processing technique may correspond to data smoothing where a data smoothing function is applied to the category data. Persons of ordinary skill in the art will recognize that not all category data may require data processing and not all transitions may indicate processing is needed. For example, even if transitions between measure of risk values of adjacent categories do not exceed thresholds 620, processing usage determiner 614 may still be employed to processes the data to generate smoother transitions between adjacent categories. In some embodiments, data processing function 618 may further indicate a type of function/representation to be used for the processing.

In example embodiments, data processing functions 618 may include, but are not limited to, trapezoidal functions, triangular functions, and Gaussian functions. For instance, for a given feature, there may be "m" categories. A "width" of each category may be defined by Equation 2:

$$\text{width}_i = p_{i+1} - p_i \quad \text{Equation 2.}$$

In Equation 2, $p_i$ corresponds to a boundary of the i-th category. The smoothing function that may be employed may be formulated based on width$_i$ and boundary $p_i$.

As an illustrative example, a trapezoidal-based processing function may be employed. The trapezoidal-based processing function may be represented by Equation 3:

$$\mu_i(x) = \begin{cases} 0 & x < a_i \\ \dfrac{x - a_i}{b_i a_i} & a_i \leq x < b_i \\ 1 & b_i \leq x < c_i \\ \dfrac{d_i - x}{d_i - c_i} & c_i \leq x < d_i \\ 0 & x \geq d_i \end{cases} \quad \text{Equation 3}$$

In Equation 3, $a_i$ corresponds to a lower base boundary of the i-th category's trapezoidal function, $d_i$ corresponds to an upper base boundary of the i-th category's trapezoidal function, $b_i$ corresponds to a lower plateau boundary of the i-th category's trapezoidal function, and $c_i$ corresponds to an upper plateau boundary of the i-th category's trapezoidal function. Furthermore, in Equation 3, $\mu_i(x)$ may correspond to a "membership function." Membership functions, as described herein, may correspond to a mechanism for applying the smoothing and, as illustrated, are determined based on the number of categories (e.g., bins) and the boundary points for a particular feature. For a given value of x, there will be m membership degrees, corresponding to the m categories.

In the example, some of the m membership degrees are zero, while some are non-zero. The non-zero membership degrees may be determined, and may be multiplied by the target's values. A target value, as described herein, corresponds to a binary value of 0 or 1, in one embodiment. For fraudulent events, the target value is set such that y=1, whereas for non-fraudulent events, the target value is set such that y=0. A value of a feature as described herein, may be related to a membership degree of that feature. For example, a member degree may reflect an extent that a particular feature is included within a corresponding category. For example, a category may have a lower bound x_1 and an upper bound x_2. The membership degree may be determined, for example, using Equation 3, where the feature's value may fall between lower bound x_1 and upper bound x_2. The membership degree, in the illustrative example, resides between 0 and 1. The result of this computation is represented, in one embodiment, by Equation 4:

$$\bar{y}_i = \dfrac{\sum_{n=1}^{N} \mu_i(x_n) y_n}{\sum_{n=1}^{N} \mu_i(x_n)}, \text{ for } i = 1, 2, \ldots, m. \quad \text{Equation 4}$$

The results of Equation 4, therefore, may correspond to the smoothed data. Furthermore, by obtaining the smoothed data for each category, the encoded WOE values (e.g., smoothed measure of risk values) may be determined for each category. The encoded WOE values may be represented by Equation 5:

$$woe_i = \log\left[\dfrac{\sum_{b=(i-1)}^{(i+1)} \mu_b(x_n) \bar{y}_b}{\sum_{b=(i-1)}^{(i+1)} \mu_b(x_n) - \sum_{b=(i-1)}^{(i+1)} \mu_b(x_n) \bar{y}_b}\right]. \quad \text{Equation 5}$$

In Equation 5, the numerator reflects the number of non-fraudulent events, while the denominator reflects the number of fraudulent events.

Processed data category generator 616, in one embodiment, may be configured to apply the processing function to the category data, as described above, and generated processed category data. The processed category data may represent each categories measure of risk value after processing has been performed. For example, in response to a smoothing function being applied to generate encoded WOE values, as represented by Equation 5, processed data category generator 616 may output data structures for each category. The data structures output by processed data category generator 616 may, in some embodiments, include rows corresponding to each entry, such that for m categories there are m rows, and for each row, there are two or more columns: one column indicating the range associated with that row, and one column indicating the measure of risk value associated with the post-processed category data.

Figure 6B:
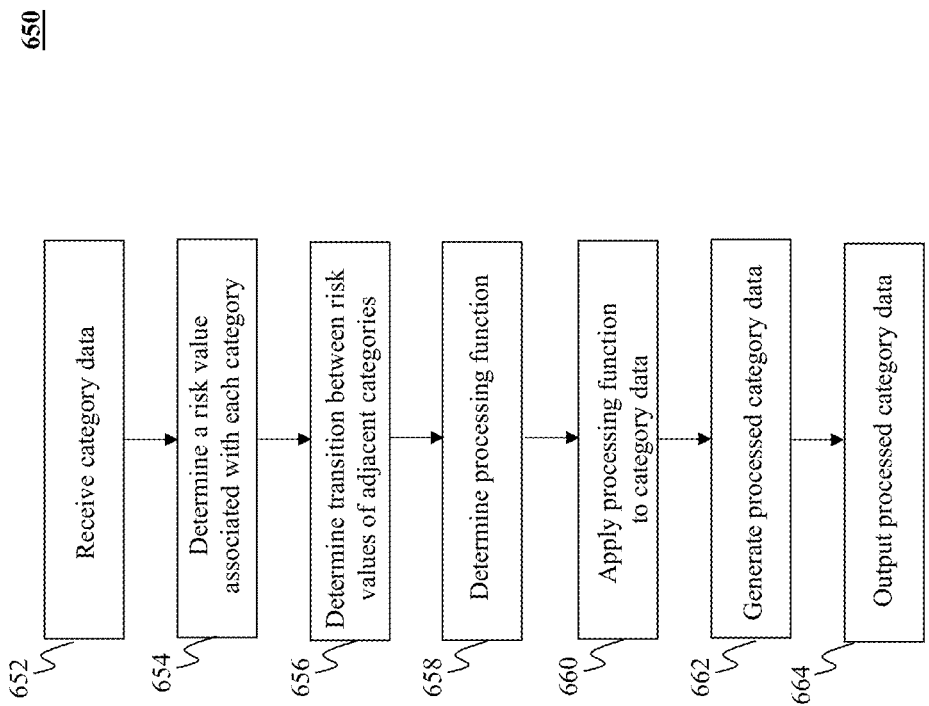
FIG. 6B is an illustrative flowchart of an exemplary process for determining and applying a smoothing function to bin data, in accordance with various embodiments of the present teaching.

FIG. 6B is an illustrative flowchart of an exemplary process for determining and applying a smoothing function to bin data, in accordance with various embodiments of the present teaching. Process 650 may begin, in a non-limiting embodiment, at step 652. At step 652, category data may be received. For example, category data output by measure or category risk value identifier 610 may be received by risk determination system 214. At step 654, a risk value associated with each category may be determined. For instance, category risk value identifier 610 may determine a measure of risk associated with each category.

At step 656, a transition value between risk values of adjacent categories may be determined. For instance, transition determination unit 612 may determine a difference between a measure of risk value for category 1 and category 2, category 2 and category 3, and so on. In some embodiments, transition determination unit 612 may determine whether any of the differences equal or exceed threshold(s) 620. At step 658, a processing function may be determined. In some embodiments, processing usage determiner 614 may determine a data processing function 618 to use to process the category data. At step 660, the processing function may be applied to the category data. At step 662, the processed category data may be generated. For example, processed data category generator 616 may generate the processed category data by applying the processing function to the category data. At step 664, the processed category data may be output. In some embodiments, the processed category data may be sent to data bin filling system 212 to be redistributed into categories and then new measure of risk values be determined by measure of risk determination system 212. In other embodiments, the processed category data may be provided to measure of risk determination system 214 for determining new measure of risk values for each category based on the applied processing. In still yet further embodiments, the processed category data may be stored within measure risk database 170.

Figure 7A:
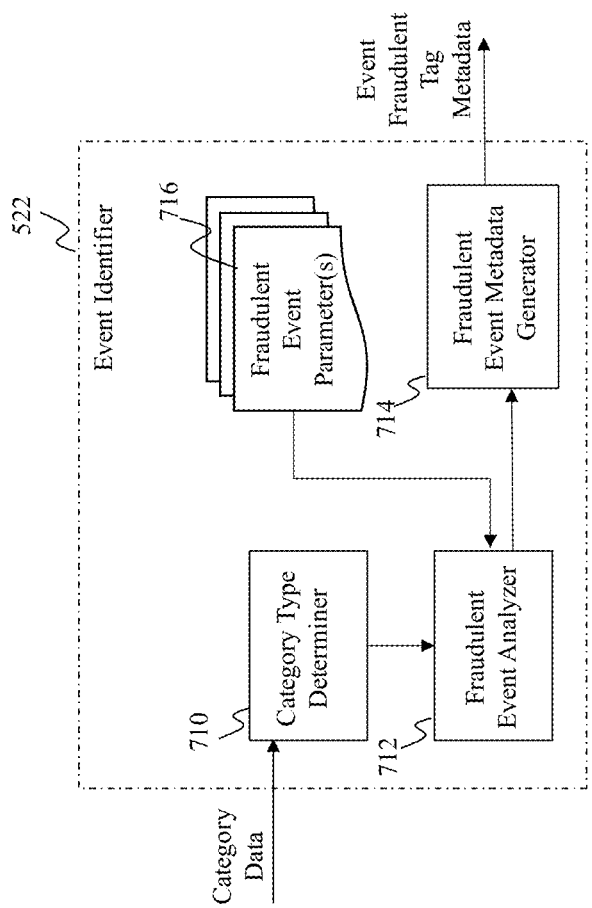
FIG. 7A is an illustrative diagram of an exemplary event identifier, in accordance with various embodiments of the present teaching.

FIG. 7A is an illustrative diagram of an exemplary event identifier, in accordance with various embodiments of the present teaching. Event identifier 522, as described previously with relation to FIG. 5A, may be configured to determine a type of event associated with particular category data. Event identifier 522, in the illustrative embodiment, may include a category type determiner 710, a fraudulent event analyzer 712, and a fraudulent event metadata generator 714. In some embodiments, event identifier 522 may be employed additionally or alternatively with respect to fraudulent event identifier 510 and non-fraudulent event identifier 512. For example, if a determination of whether events included with category data are fraudulent has yet to occur, event identifier 522, as described with reference to FIG. 7A, may be employed.

Category type determiner 710 may be configured, in one embodiment, to determine a type of category associated with the category data. Category type determiner 710 may receive category data, and based on the category data, may determine a type of category and/or a feature associated with the category data. In some embodiments, category type determiner 710 may be substantially similar to category type identifier 410, and the previous description may apply.

Fraudulent event analyzer 712 may be configured to determine whether each of the events represented within the category data are fraudulent. In some embodiments, fraudulent event analyzer 712 may access fraudulent event parameters 716 to determine the parameters that indicate whether a particular event is classified as being fraudulent or non-fraudulent. For example, fraudulent event parameter(s) 716 may include CTR and/or TTC, amongst other parameters. In one embodiment, the event data may indicate a particular CTR for each event represented by the event data, and based on the CTR, fraudulent event analyzer 712 may classify each event as being fraudulent or non-fraudulent.

Fraudulent event metadata generator 714 may be configured to obtain the classifications of fraudulence for each event as performed by fraudulent event analyzer 712, and may generate metadata indicating that particular event's fraudulence. In some embodiments, fraudulent event metadata generator 714 may generate a logical 1 to indicate that an event has been classified as fraudulent, while a logical 0 may be generated to indicate that an event has been classified as non-fraudulent. The fraudulent event metadata that is generated for each event may then be output by event identifier 522 and appended to a data structure associated with the event's category. For example, column 444 of data structure 440 may be populated based on the metadata generated by fraudulent event metadata generator 714. Furthermore, in some embodiments, event identifier 522 may be employed prior to analysis by risk evaluation system 140. In this particular scenario, event identifier 522 may access interaction data from interaction database 150, and may determine whether events represented by the interaction data correspond to fraudulent events or non-fraudulent events. In this particular scenario, the determination of fraudulence may have already occurred, and therefore risk evaluation system 140 may not need to perform such a task.

Figure 7B:
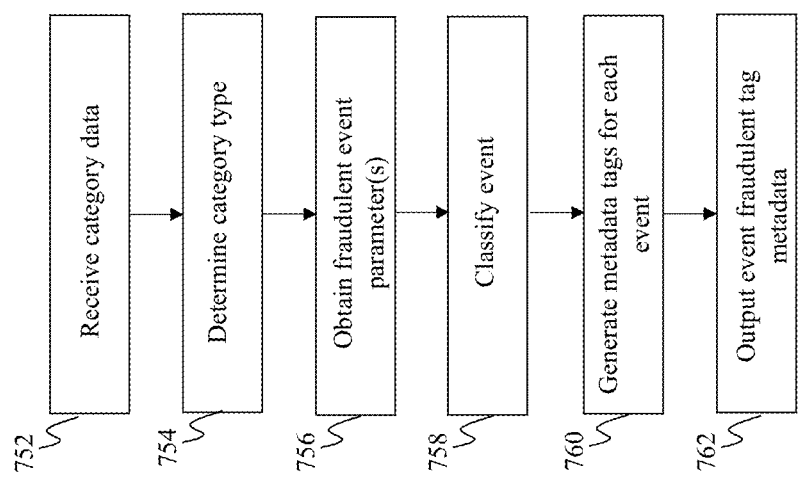
FIG. 7B is an illustrative flowchart of an exemplary process for determining whether an event is a fraudulent event, in accordance with various embodiments of the present teaching.

FIG. 7B is an illustrative flowchart of an exemplary process for determining whether an event is a fraudulent event, in accordance with various embodiments of the present teaching. Process 750, in a non-limiting embodiment, may begin at step 752. At step 752, category data may be received. For example, category type determiner 710 may receive category data from data bin filling system 212. At step 753, a category type may be determined. For example, category type determiner 710 may determine a type of category that the category data is associated with. At step 756, one or more fraudulent event parameters may be obtained. For instance, fraudulent event parameter(s) 718 may be obtained based on the type of category that was determined by category type determiner 710. At step 758, each event included within the category data may be classified. In some embodiments, the classification of each event may be based on the category type and the one or more fraudulent event parameters 718. At step 760, metadata tags for each event may be generated. For instance, the metadata tags may indicate whether each event represents a fraudulent event or a non-fraudulent event. At step 762, event fraudulent tag metadata may be output. For instance, the category data may be appended to include the metadata tags for each event included within the category data.

As an illustrative example of the process for reducing risk value discrepancies between categories may now be described. This example is meant to be illustrative and not limiting.

A predictive model may include a feature, represented by X. Feature X may have nine categories. The nine categories for feature X may be determined, for example, based on a Chi-Merge discretization algorithm, as described above. The categories may have boundaries associated with the ranges that each boundary corresponds to. Table 1 details, for example, the nine categories associated with feature X, the boundaries associated with feature X, and the measure of risk values for feature X. In the illustrative embodiment, the measure of risk values for feature X correspond to measure of risk values determined prior to data processing being performed.

TABLE 1

| Category Identifier | Category Boundaries | Measure of Risk Value |
|---|---|---|
| 1 | (0, 70.85] | −0.77189 |
| 2 | (70.85, 125.09] | −0.576893 |
| 3 | (125.09, 199.99] | −0.322446 |
| 4 | (199.99, 321.73] | −0.272197 |
| 5 | (321.73, 442.66] | −0.198860 |
| 6 | (442.66, 681.79] | 0.375895 |
| 7 | (681.79, 803.00] | 0.464761 |
| 8 | (803.00, 989.91] | 0.553614 |
| 9 | (989.1, ∞) | 0.712883 |

As seen from Table 1, for feature X having a value X=442 corresponds to category 5, and a measure of risk value (e.g., WOE value) of −0.198860. If the feature value is, instead, slightly changed, such that X=443, then X corresponds to category 6, having a measure of risk value of 0.375895. The difference between these two measure of risk values, therefore, is 0.574755. Therefore, the transition from category 5 to category 6 is substantially large.

Inputting the measure of risk value for X=442 and X=443 into the predictive model may yield predictive scores. In one example embodiment, the predictive score for a predictive model may be represented by Equation 6:

$$\text{Predictive Score} \approx (797.67 + 100.72 * \text{Measure\_of\_risk}) \quad \text{Equation 6.}$$

Using Equation 6, the predictive score for X=442 would be approximately 778, whereas the predictive score for X=443 would be approximately 836. Therefore, a one-point difference in feature value X corresponds to a 58 point predictive score variance. In some embodiments, a threshold may be set for fraudulent activity detection. This threshold, for example, may be set at 800 in many real-word scenario. Therefore, the one point difference in feature value X may cause an event to be associated with suspicious activity. By applying the processing function, as described above, and re-determining the measure of risk values, the measure of risk values may be reduced/adjusted such that such small differences do not cause large variances in predictive scores.

Figure 7C:
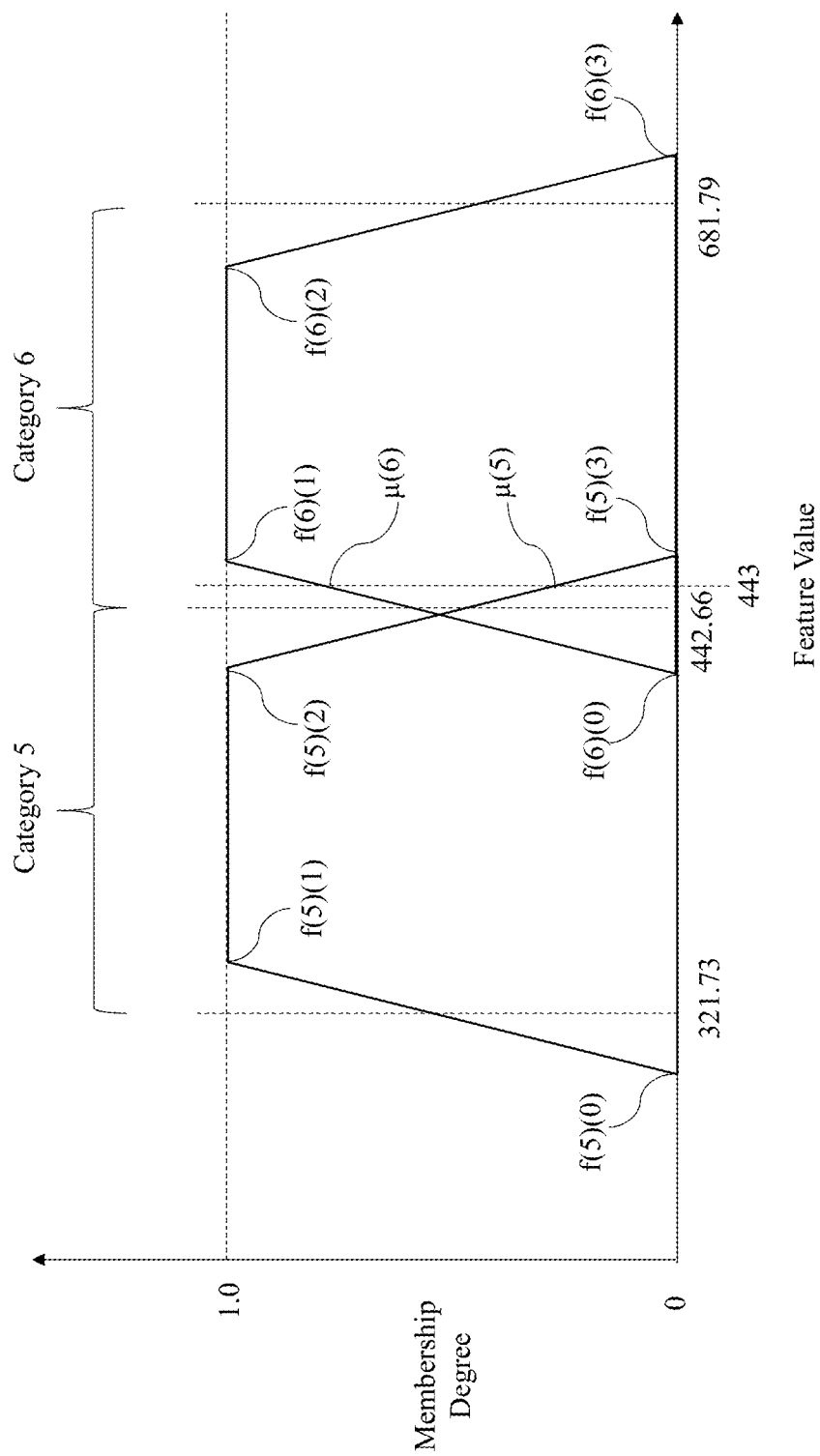
FIG. 7C is an illustrative graph of two example processed categories, in accordance with various embodiments of the present teachings.

FIG. 7C is an illustrative graph of two example processed categories, in accordance with various embodiments of the present teachings. Graph 770, in the illustrative embodiment, includes a feature represented by a trapezoidal functions that has been segmented into two categories, "Category 5" and "Category 6," as described in reference to Table 1 above. Category 5 has a lower bound being a first feature value (e.g., X=321.73) and an upper bound being a second feature value (e.g., X=442.66). Category 6 has a lower bound being the second feature value (e.g., X=442.66) and an upper bound being a third feature value (e.g., X=681.79). Therefore, in the illustrative embodiment, Category 5 has a first width (e.g., 442.66−321.73=120.93), while Category 6 has a second width (e.g., 681.79−442.66=239.13).

Each trapezoidal function encompassed by Category 5 and Category 6 includes four vertices each having a membership degree, "f." For instance, Category 5 includes a lower left limit f(5)(0), an upper left limit f(5)(1), an upper right limit f(5)(2), and a lower right limit f(5)(3). Category 6 includes a lower left limit f(6)(0), an upper left limit f(6)(1), an upper right limit f(6)(2), and a lower right limit f(6)(3). The determination of each limit may be represented below by Table 2.

TABLE 2

| Limit Reference | Limit Representation | Value |
|---|---|---|
| f(5)(0) | Category 5(lower bound) − α * first_width = | 321.73 − 1./3 * 121.23 = 281.32 |
| f(5)(1) | Category 5(lower bound) + α * first_width | 321.73 + 121.23/3.0 = 362.14 |
| f(5)(2) | Category 5(lower bound) + 2.0*α*first_width | 321.73 + 2.0 * 121.23/3.0 = 402.55 |
| f(5)(3) | Category 5(upper bound) + α * first_width | 442.66 + 1./3 * 121.23 = 483.07 |
| f(6)(0) | Category 6(lower bound) − α* second_width | 442.66 − 1.0/3 * 239.13 = 362.95 |
| f(6)(1) | Category 6(lower bound) + α * * second_width | 442.66 + 239.13/3.0 = 522.37 |
| f(6)(2) | Category 6(lower bound) + 2.0 * α * second_width | 442.66 + 2.0*239.13/3.0 = 602.08 |
| f(6)(3) | Category 6(upper bound) + α * second_width | 681.79 + 1./3 * 239.13 = 761.50 |

In Table 2, α may be set as a constant value of ⅓. Using Equation 4, values for the second measure of risk (e.g., the smoothed data representing the processed measure of risk) may be generated. For instance, ȳ(5)=0.4117, ȳ(6)=0.7399, and ȳ(7)=0.7866 based on the values for f(5) and f(6) described in Table 2.

For a feature value of X=443.0, however, the value for μ for both Category 5 and Category 6 may be determined. For example, based on Equation 3, μ(5) may be determined to equal 0.49579 (e.g., μ(5)=1.0−(X−f(5)(2)/f(5)(3)−(f)(5)(2))), while μ(6) may be determined to equal 0.50214 (e.g., μ(6)=X−f(6)(0)/f(6)(1)−f(6)(0)). Furthermore, μ(7) may be determined to equal 0.0 based on Equation 3. To calculate the WOE for each of Category 5 and Category 6, Equation 5 may be employed. For instance, as seen by Equation 7 below:

$$WOE = [\mu(5)^*\bar{y}(5) + \mu(6)^*\bar{y}(6) + \mu(7)^*\bar{y}(7)] / \quad \text{Equation 7.}$$
$$[\mu(5) + \mu(6) + \mu(7)]$$
$$= [0.49579 * 0.4117 + 0.50214 * 0.7399 + 0.0] /$$
$$[0.49579 + 0.50214 + 0.0]$$
$$= [0.5757] / [0.42223] = 0.3100.$$

Employing Equation 6 with the result of Equation 7 therefore yields the smoothed predictive score of 830 (e.g., Predictive_Score=793.34+118.26*0.3100=830). Of note here is that, because the new smoothed data is obtained, the values for the predictive score have changed from 797.67 to 793.34 and 100.72 to 118.26. This is due to the smoothed data causing the model to continually update with each new instance of newly smoothed data that is generated.

Figure 8:
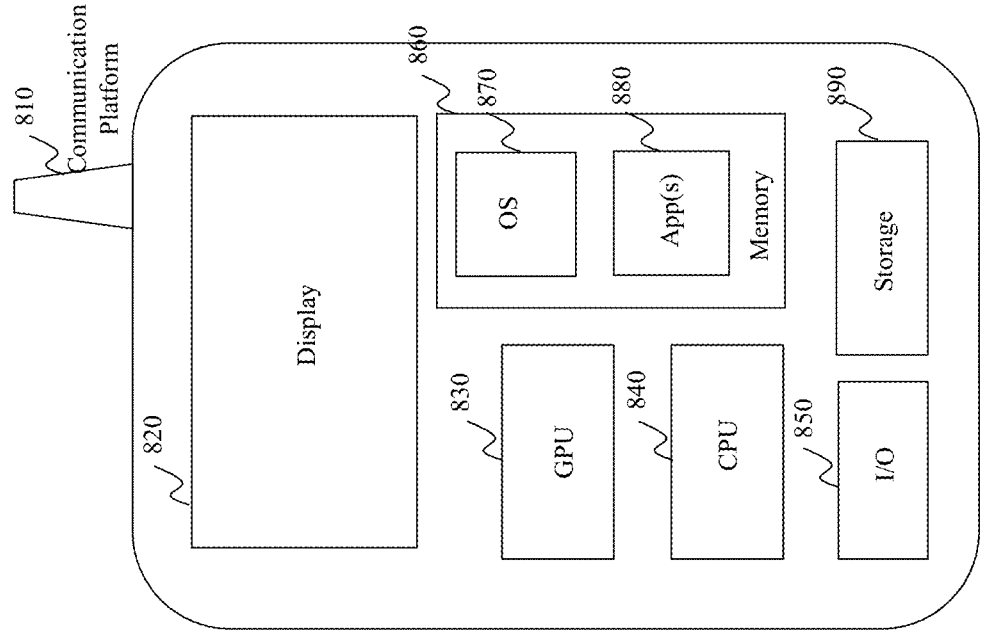
FIG. 8 is an illustrative diagram of an exemplary mobile device architecture that may be used to realize a specialized system implementing the present teaching in accordance with various embodiments.

FIG. 8 is an illustrative diagram of an exemplary mobile device architecture that may be used to realize a specialized system implementing the present teaching in accordance with various embodiments. In this example, the user device on which the fraudulent event detection systems and methods is implemented corresponds to a mobile device 800, including, but is not limited to, a smart phone, a tablet, a music player, a handled gaming console, a global positioning system (GPS) receiver, and a wearable computing device (e.g., eyeglasses, wrist watch, etc.), or in any other form factor. Mobile device 800 may include one or more central processing units ("CPUs") 840, one or more graphic processing units ("GPUs") 830, a display 820, a memory 860, a communication platform 810, such as a wireless communication module, storage 890, and one or more input/output (I/O) devices 850. Any other suitable component, including but not limited to a system bus or a controller (not shown), may also be included in the mobile device 800. As shown in FIG. 8, a mobile operating system 870 (e.g., iOS, Android, Windows Phone, etc.), and one or more applications 880 may be loaded into memory 860 from storage 860 in order to be executed by the CPU 840. The applications 880 may include a browser or any other suitable mobile apps for determining one or more fraudulent events on mobile device 800. User interactions with the content may be achieved via the I/O devices 850 and provided to the risk evaluation system 140.

To implement various modules, units, and their functionalities described in the present disclosure, computer hardware platforms may be used as the hardware platform(s) for one or more of the elements described herein (e.g., rule optimization and telemetry analysis server 140). The hardware elements, operating systems and programming languages of such computers are conventional in nature, and it is presumed that those skilled in the art are adequately familiar therewith to adapt those technologies to detect one or more fraudulent events as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 9:
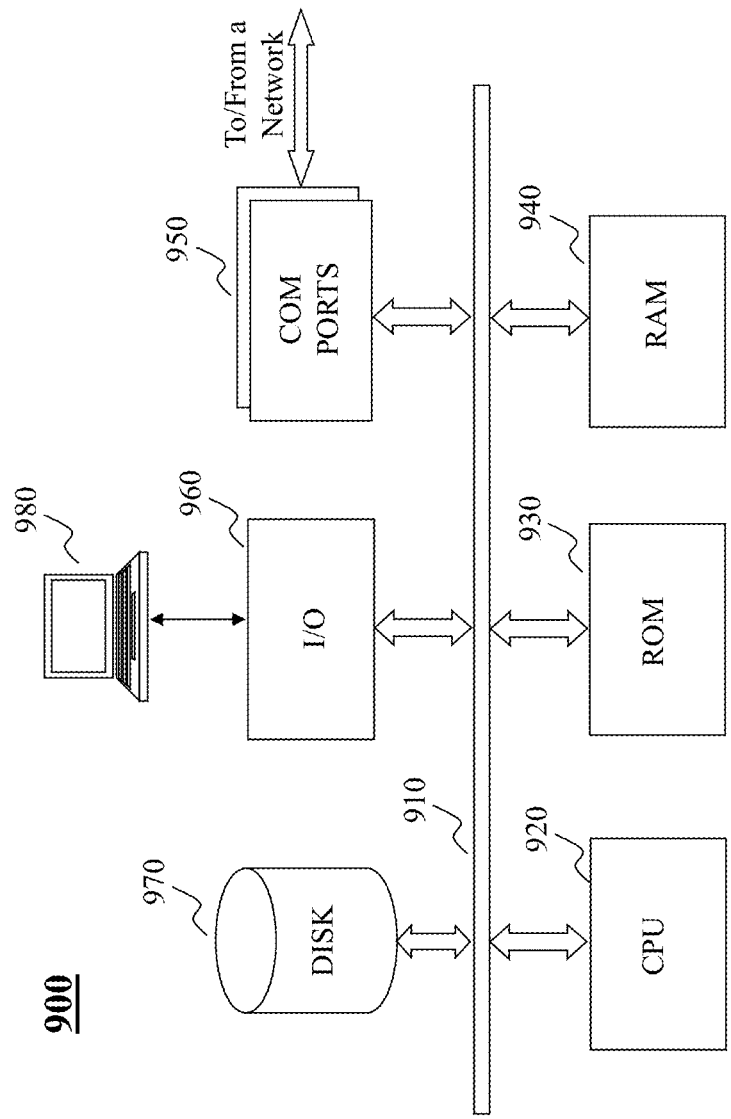
FIG. 9 is an illustrative diagram of an exemplary computing device architecture that may be used to realize a specialized system implementing the present teaching in accordance with various embodiments.

FIG. 9 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 900 may be used to implement any component of fraudulent event detection techniques, as described herein. For example, a fraudulent event detection system may be implemented on a computer such as computer 900, via its hardware, software program, firmware, or a combination thereof. Although only one such computer is shown, for convenience, the computer functions relating to fraudulent event detection as described herein may be implemented in a distributed fashion on a number of similar platforms, to distribute the processing load.

Computer 900, for example, includes COM ports 950 connected to and from a network connected thereto to facilitate data communications. Computer 900 also includes a central processing unit (CPU) 920, in the form of one or more processors, for executing program instructions. The exemplary computer platform includes an internal communication bus 910, program storage and data storage of different forms (e.g., disk 970, read only memory (ROM) 930, or random access memory (RAM) 940), for various data files to be processed and/or communicated by computer 900, as well as possibly program instructions to be executed by CPU 920. Computer 900 also includes an I/O component 960, supporting input/output flows between the computer and other components therein such as user interface elements 980. Computer 900 may also receive programming and data via network communications.

Hence, aspects of the methods of detecting one or more fraudulent events and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with detection of one or more fraudulent events. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the fraudulent event detection techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method for removing perturbations from predictive scoring, the method being implemented on at least one computing device having at least one processor, memory, and communications circuitry, and the method comprising:
    allocating at least a portion of a memory for a data structure including first category data associated with a plurality of events detected by a content provider, the data structure including, for each event, an identifier, temporal information, an indication of one of a number of categories to which the event belongs, and an indication whether the event was fraudulent, each category being associated with a range of times;
    determining, based on information stored in the data structure, a first measure of a risk for each category, wherein the first measure of the risk indicates a likelihood that a future event occurring at a future time within a range of times associated with the category is fraudulent;
    generating second category data for obtaining a second measure of risk for each category, wherein the second measure of risk mitigates a transition of the corresponding first measure of risk of the category and the first measure of risk for an adjacent category, and wherein the category corresponds to a first range of times and the adjacent category corresponds to a second range of times adjacent to the first range of times;
    adjusting the first measure of risk based on the second category data;
    determining, based on the adjusted first measure of risk, the second measure of the risk for each category, wherein the second measure indicates an adjusted likelihood; and
    storing, in a measure risk database, the second measure of risk for each category and the range of times associated with that category for future use by one or more predictive models to determine a likelihood that a future event occurring at a future time is fraudulent.

2. The method of claim 1, wherein generating the second category data by processing the first category data comprises:
    applying a smoothing function to the first category data, wherein the smoothing function is operable to mitigate transitions between a first value of the first measure of risk for one category and a second value of the first measure of risk for an adjacent category for the transitions that exceed a preset transition threshold value.

3. The method of claim 2, further comprising:
    determining a transition value associated with each of the transitions for each category;
    determining, for each category, whether the transition value exceeds the preset transition threshold value; and
    obtaining, in response to a corresponding transition value associated with one of the categories being determined to exceed the present transition threshold value, the smoothing function.

4. The method of claim 1, wherein one of the categories comprises the future time.

5. The method of claim 1, further comprising:
    receiving new data representing a plurality of new events detected by the content provider, the new data indicating a new time that a corresponding new event occurred and whether the corresponding new event was fraudulent, wherein the plurality of new events corresponds to a duration of times subsequent to a previous duration of times associated with the data previously received;
    generating third category data comprising by grouping each of the plurality of new event into one of the number of categories;
    determining a third measure of the risk for each category; and
    determining whether a difference between the third measure of risk for each category and a corresponding second measure of risk for each category exceeds a predetermined measure of risk threshold value, indicating that the third category data is to be ignored.

6. The method of claim 5, further comprising:
    determining a fourth measure of risk for each category based on, for each category, the first measure of risk, the second measure of risk, and the third measure of risk; and
    storing new measure data representing the fourth measure of risk for each category and the range of times associated with that category.

7. A system for removing perturbations from predictive scoring, the system comprising:
    a data bin filling system implemented by a processor and configured to:
    allocate at least a portion of a memory for a data structure including first category data associated with a plurality of events detected by a content provider, the data structure including, for each event, an identifier, temporal information, an indication of one of a number of categories to which the event belongs, and an indication whether the event was fraudulent, each category being associated with a range of times, and
    generate second category data for obtaining a second measure of risk for each category, wherein the second measure of risk mitigates a transition of the corresponding first measure of risk of the category and the first measure of risk for an adjacent category, and wherein the category corresponds to a first range of times and the adjacent category corresponds to a second range of times adjacent to the first range of times;

a measure of risk determination system implemented by
the processor and configured to:
determine, based on information stored in the data structure, a first measure of a risk for each category, wherein the first measure of the risk indicates a likelihood that a future event occurring at a future time within a range of times associated with the category is fraudulent,
adjust the first measure of risk based on the second category data, and
determine, based on the adjusted first measure of risk, the second measure of the risk for each category, wherein the second measure indicates an adjusted likelihood; and
a measure risk database implemented by the processor and configured to store the second measure of risk for each category and the range of times associated with that category for future use by one or more predictive models to determine a likelihood that a future event occurring at a future time is fraudulent.

8. The system of claim 7, further comprising:
a data smoothing application system implemented by the processor and configured to apply a smoothing function to the first category data, wherein the smoothing function is operable to mitigate transitions between a first value of the first measure of risk for one category and a second value of the first measure of risk for an adjacent category for the transitions that exceed a preset transition threshold value.

9. The system of claim 8, wherein the measure of risk determination system is implemented by the processor and further configured to:
determine a transition value associated with each of the transitions for each category;
determine, for each category, whether the transition value exceeds the preset transition threshold value;
obtain, in response to a corresponding transition value associated with one of the categories being determined to exceed the present transition threshold value, the smoothing function.

10. The system of claim 7, wherein one of the categories comprises the future time.

11. The system of claim 7, further comprising:
a user event detection system implemented by the processor and configured to receive new data representing a plurality of new events detected by the content provider, the new data indicating a new time that a corresponding new event occurred and whether the corresponding new event was fraudulent, wherein the plurality of new events corresponds to a duration of times subsequent to a previous duration of times associated with the data previously received,
wherein the data bin filling system is implemented by the processor and further configured to generate third category data comprising by grouping each of the plurality of new events into one of the number of categories; and
wherein the measure of risk determination system is further configured to:
determine a third measure of the risk for each category, and
determine whether a difference between the third measure of risk for each category and a corresponding second measure of risk for each category exceeds a predetermined measure of risk threshold value, indicating that the third category data is to be ignored.

12. The system of claim 11, wherein:
the measure of risk determination system is implemented by the processor and further configured to determine a fourth measure of risk for each category based on, for each category, the first measure of risk, the second measure of risk, and the third measure of risk; and
the measure risk database is further configured to store new measure data representing the fourth measure of risk for each category and the range of times associated with that category.

13. A non-transitory computer readable medium comprising instructions for removing perturbations from predictive scoring, wherein the instructions, when read by at least one processor of a computing device, cause the computing device to:
allocate at least a portion of a memory for a data structure including first category data associated with a plurality of events detected by a content provider, the data structure including, for each event, an identifier, temporal information, an indication of one of a number of categories to which the event belongs, and an indication whether the event was fraudulent,
each category being associated with a range of times;
determine, based on information stored in the data structure, a first measure of a risk for each category, wherein the first measure of the risk indicates a likelihood that a future event occurring at a future time within a range of times associated with the category is fraudulent;
generate second category data for obtaining a second measure of risk for each category, wherein the second measure of risk mitigates a transition of the corresponding first measure of risk of the category and the first measure of risk for an adjacent category, and wherein the category corresponds to a first range of times and the adjacent category corresponds to a second range of times adjacent to the first range of times;
adjust the first measure of risk based on the second category data;
determine, based on the adjusted first measure of risk, the second measure of the risk for each category, wherein the second measure indicates an adjusted likelihood; and
store, in a measure risk database, the second measure of risk for each category and the range of times associated with that category for future use by one or more predictive models to determine a likelihood that a future event occurring at a future time is fraudulent.

14. The non-transitory computer readable medium of claim 13, wherein the instructions associated with the second category data being generated by processing the first category data, when read by at least one processor of a computing device, cause the computing device to:
apply a smoothing function to the first category data, wherein the smoothing function is operable to mitigate transitions between a first value of the first measure of risk for one category and a second value of the first measure of risk for an adjacent category for the transitions that exceed a preset transition threshold value.

15. The non-transitory computer readable medium of claim 14, wherein the instructions, when read by the at least one processor, further cause the computing device to:
determine a transition value associated with each of the transitions for each category;
determine, for each category, whether the transition value exceeds the preset transition threshold value; and
obtain, in response to a corresponding transition value associated with one of the categories being determined to exceed the present transition threshold value, the smoothing function.

16. The non-transitory computer readable medium of claim 13, wherein:
one of the categories comprises the future time.

17. The non-transitory computer readable medium of claim 13, wherein the instructions, when read by the at least one processor, further cause the computing device to:
receive new data representing a plurality of new events detected by the content provider, the new data indicating a new time that a corresponding new event occurred and whether the corresponding new event was fraudulent, wherein the plurality of new events corresponds to a duration of times subsequent to a previous duration of times associated with the data previously received;
generate third category data comprising by grouping each of the plurality of new events into one of the number of categories;
determine a third measure of the risk for each category; and
determine whether a difference between the third measure of risk for each category and a corresponding second measure of risk for each category exceeds a predetermined measure of risk threshold value, indicating that the third category data is to be ignored.

18. The non-transitory computer readable medium of claim 17, wherein the instructions, when read by the at least one processor, further cause the computing device to:
determine a fourth measure of risk for each category based on, for each category, the first measure of risk, the second measure of risk, and the third measure of risk; and
store new measure data representing the fourth measure of risk for each category and the range of times associated with that category.

* * * * *